US010602379B2

(12) United States Patent
Lin et al.

(10) Patent No.: US 10,602,379 B2
(45) Date of Patent: Mar. 24, 2020

(54) WIRELESS COMMUNICATION METHOD, WIRELESS COMMUNICATION DEVICE AND NON-TRANSITORY COMPUTER READABLE RECORDING MEDIUM THEREOF

(71) Applicant: INDUSTRIAL TECHNOLOGY RESEARCH INSTITUTE, Hsinchu (TW)

(72) Inventors: You-En Lin, Taichung (TW); Ting-Ming Tsai, Zhudong Township (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 777 days.

(21) Appl. No.: 14/583,413

(22) Filed: Dec. 26, 2014

(65) Prior Publication Data
US 2015/0334579 A1 Nov. 19, 2015

Related U.S. Application Data

(60) Provisional application No. 62/000,512, filed on May 19, 2014.

(51) Int. Cl.
*H04W 48/16* (2009.01)
*H04W 24/02* (2009.01)
(Continued)

(52) U.S. Cl.
CPC ............ *H04W 24/02* (2013.01); *H04W 48/14* (2013.01); *H04W 12/06* (2013.01); *H04W 24/10* (2013.01);
(Continued)

(58) Field of Classification Search
CPC . H04W 36/0072; H04W 36/77; H04W 48/16; H04W 48/17; H04W 48/20;
(Continued)

(56) References Cited

U.S. PATENT DOCUMENTS 6,865,609 B1 * 3/2005 Gubbi ..................... H04L 29/06
370/349
8,213,302 B2 7/2012 Wang et al.
(Continued)

FOREIGN PATENT DOCUMENTS

CN 1852329 A 10/2006
CN 101150597 A 3/2008
(Continued)

OTHER PUBLICATIONS

Berezin et al. "Multichannel Virtual Access Points for Seamless Handoffs in IEEE 802.11 Wireless Networks", 2011 IEEE.
(Continued)

*Primary Examiner* — Un C Ho
*Assistant Examiner* — Kenan Cehic
(74) *Attorney, Agent, or Firm* — Birch, Stewart, Kolasch & Birch, LLP

(57) ABSTRACT

A wireless communication method comprises the following steps: a Static and Public Virtual Access Point (PS-VAP) on a Physical Access Point (PAP) receives a Probe Request from a station; the PS-VAP sends a Virtual Access Point (VAP) Setup Request to a server in response to the Probe Request; the PAP creates a Dedicated-and-Dynamic VAP (DD-VAP) having a Service Set Identifier (SSID) for the station according to a VAP Setup Response sent from the server; and the DD-VAP sends a Probe Reply including the SSID of the DD-VAP to the station.

35 Claims, 22 Drawing Sheets

(51) Int. Cl.
  *H04W 48/14* (2009.01)
  *H04W 24/10* (2009.01)
  *H04W 60/00* (2009.01)
  *H04W 84/12* (2009.01)
  *H04W 88/08* (2009.01)
  *H04W 12/06* (2009.01)
  *H04W 76/10* (2018.01)

(52) U.S. Cl.
  CPC ............ *H04W 60/00* (2013.01); *H04W 76/10* (2018.02); *H04W 84/12* (2013.01); *H04W 88/08* (2013.01)

(58) Field of Classification Search
  CPC ... H04W 88/08; H04W 88/12; H04W 92/045; H04W 92/12
  See application file for complete search history.

(56) References Cited

U.S. PATENT DOCUMENTS

| | | | |
|---|---|---|---|
| 8,555,364 | B2 | 10/2013 | Filippi et al. |
| 8,605,697 | B2 | 12/2013 | Kuo et al. |
| 8,631,471 | B2 | 1/2014 | Dattagupta et al. |
| 2004/0121749 | A1 | 6/2004 | Cui et al. |
| 2004/0141617 | A1 | 7/2004 | Volpano |
| 2004/0177125 | A1 | 9/2004 | Ellison et al. |
| 2006/0104230 | A1* | 5/2006 | Gidwani .............. H04W 84/00 370/328 |
| 2006/0165103 | A1 | 7/2006 | Trudeau et al. |
| 2007/0026807 | A1* | 2/2007 | Kish ................... H04B 7/0408 455/63.4 |
| 2007/0147318 | A1 | 6/2007 | Ross et al. |
| 2007/0206527 | A1 | 9/2007 | Lo et al. |
| 2009/0059848 | A1* | 3/2009 | Khetawat .......... H04L 29/12367 370/328 |
| 2009/0141685 | A1* | 6/2009 | Berglund .......... H04W 36/0055 370/331 |
| 2012/0209934 | A1 | 8/2012 | Smedman |
| 2012/0287893 | A1* | 11/2012 | Horn ....................... H04L 29/06 370/329 |
| 2013/0317892 | A1* | 11/2013 | Heerboth .............. H04W 88/08 705/14.4 |
| 2013/0347065 | A1 | 12/2013 | Filippi et al. |
| 2014/0016568 | A1 | 1/2014 | Koskela et al. |
| 2014/0050167 | A1* | 2/2014 | Smedman ............. H04W 48/14 370/329 |
| 2014/0204797 | A1* | 7/2014 | Lu ......................... H04W 48/16 370/254 |
| 2014/0287769 | A1* | 9/2014 | Taori ................. H04W 74/0808 455/450 |
| 2015/0065157 | A1* | 3/2015 | Homchaudhuri ... H04W 72/082 455/452.1 |
| 2015/0133154 | A1* | 5/2015 | Do ......................... G01S 5/0252 455/456.1 |
| 2015/0334579 | A1* | 11/2015 | Lin ....................... H04W 48/14 370/329 |
| 2015/0365881 | A1* | 12/2015 | Scherzer ............... H04W 48/14 455/414.1 |
| 2015/0373685 | A1* | 12/2015 | Seok .................... H04W 74/002 370/329 |
| 2016/0330077 | A1* | 11/2016 | Jin ....................... H04L 41/0806 |
| 2017/0115949 | A1* | 4/2017 | Kim ....................... H04W 76/10 |

FOREIGN PATENT DOCUMENTS

| | | |
|---|---|---|
| CN | 101335663 A | 12/2008 |
| CN | 101707596 A | 5/2010 |
| CN | 101931954 A | 12/2010 |
| CN | 102546631 A | 7/2012 |
| CN | 103229560 A | 7/2013 |
| CN | 103535082 A | 1/2014 |
| TW | 201136380 A1 | 10/2011 |
| TW | 201301926 A | 1/2013 |
| TW | I442790 B | 6/2014 |
| WO | WO 2009/073529 A1 | 6/2009 |
| WO | WO 2013/011088 A1 | 1/2013 |

OTHER PUBLICATIONS

Braham et al. "Virtual access point to the Cloud", 2012 IEEE 1st International Conference on Cloud Networking (CLOUDNET).
Dely et al. "CloudMAC—An OpenFlow based Architecture for 802.11 MAC Layer Processing in the Cloud", 2012 IEEE, GC'12 Workshop: The 8th Broadband Wireless Access Workshop.
Funabiki et al. "A Proposal of Access-Point Aggregation Approach for Multiple Wireless Local Area Networks", 2012 IEEE DOI 10.1109/CISIS.2012.121.
Grunenberger et al. "Virtual Access Points for Transparent Mobility in Wireless LANs", IEEE Communications Society, 2010.
Hamaguchi et al. "A Framework of Better Deployment for WLAN Access Point using Virtualization Technique", 2010 IEEE DOI 10.1109/WAINA.2010.61.
LAN MAN Standards Committee of the IEEE Computer Society "Information technology—Telecommunications and information exchange between systems—Local and metropolitan area networks—Specific requirements", ANSI/IEEE Std 802.11, 1999 Edition (R2003).
Lin et al. "Creation, Management and Mobility of Virtual Access Points in Wireless Local Area Networks", ICL Technical Journal, Apr. 25, 2014.
Lin et al. "Design of Power Control Protocols for Spectrum Sharing in Cognitive Radio Networks: A Game-Theoretic Perspective", 2010 IEEE Communications Society.
Lin et al. "Joint Optimization of Resource Allocation and Modulation Coding Schemes for Unicast Video Streaming in OFDMA Networks", 2012 IEEE 23rd International Symposium on Personal, Indoor and Mobile Radio Communications—(PIMRC).
Popovski et al. Mobile and wireless communications Enablers for the Twenty-twenty Information Society (METIS), ICT-317669-METIS/D1.1.
Zhang et al. "Cooperative Interference Management With MISO Beamforming", IEEE Transactions on Signal Processing, vol. 58, No. 10, Oct. 2010.
Aboba et al. "Network Discovery and Selection Problem", RFC 5113. Jan. 1, 2008. XP015055182.

* cited by examiner

WIRELESS COMMUNICATION METHOD, WIRELESS COMMUNICATION DEVICE AND NON-TRANSITORY COMPUTER READABLE RECORDING MEDIUM THEREOF

This application claims the benefit of U.S. provisional application Ser. No. 62/000,512, filed May 19, 2014, the disclosure of which is incorporated by reference herein in its entirety.

TECHNICAL FIELD

The disclosure relates in general to applications of wireless communication, and more particularly to a wireless communication method, a wireless communication device and a non-transitory computer readable recording medium thereof.

BACKGROUND

Access points (APs) in current wireless local area network operate independently and are managed manually by logging into the terminal for configuration. To access network service, client stations have to scan possible channels, executes the processes of authentication and association.

However, these processes may take several seconds and greatly degrades the user experience. Additionally, if stations require high throughput and ubiquitous network accessing by distributing high-density APs, the performance of whole network does not grow as expected due to ill management of the independent APs.

Therefore, there is a need for providing a wireless communication method, a wireless communication device and a non-transitory computer readable recording medium thereof, which are capable of providing customized wireless services for stations and coordinating the network by the unit of per station.

SUMMARY

The disclosure is directed to a wireless communication method, a wireless communication device and a non-transitory computer readable recording medium thereof. According to a wireless communication method, a wireless communication device and a non-transitory computer readable recording medium disclosed in examples, a station in the network can be provided with a Dedicated-and-Dynamic VAP (DD-VAP) created on a PAP. The DD-VAP can be customized and configured by the server. By using the DD-VAP, the server can optimize the network by separately adjusting the transmission profile of a station, and the station can use its station profile to access the network and could reduce the latency of getting data service from the network.

An embodiment in accordance with the disclosure, a wireless communication method is provided. The wireless communication method comprises the following steps: a Static and Public Virtual Access Point (PS-VAP) created on a Physical Access Point (PAP) receives a probe request from a station; the PS-VAP sends a Virtual Access Point (VAP) setup request to a server in response to the probe request; the PAP creates a Dedicated-and-Dynamic VAP (DD-VAP) having a Service Set Identifier (SSID) for the station according to a VAP setup response sent from the server; and the DD-VAP sends a probe reply including the SSID of the DD-VAP to the station.

Another embodiment in accordance with the disclosure, a wireless communication device is provided. The wireless communication device comprises a receiver, a transmitter and a processor. The receiver receives a probe request from a station. The transmitter sends a Virtual Access Point (VAP) setup request to a server in response to the probe request. The processor creates a Dedicated-and-Dynamic VAP (DD-VAP) having a Service Set Identifier (SSID) for the station according to a VAP setup response sent from the server, making the transmitter send a probe reply including the SSID of the DD-VAP to the station by the DD-VAP.

The disclosure further provides a non-transitory computer readable recording medium for storing one or more programs, the one or more programs causing a processor to perform the aforementioned control method after the one or more programs are loaded on a computer and are executed.

Figure 1:
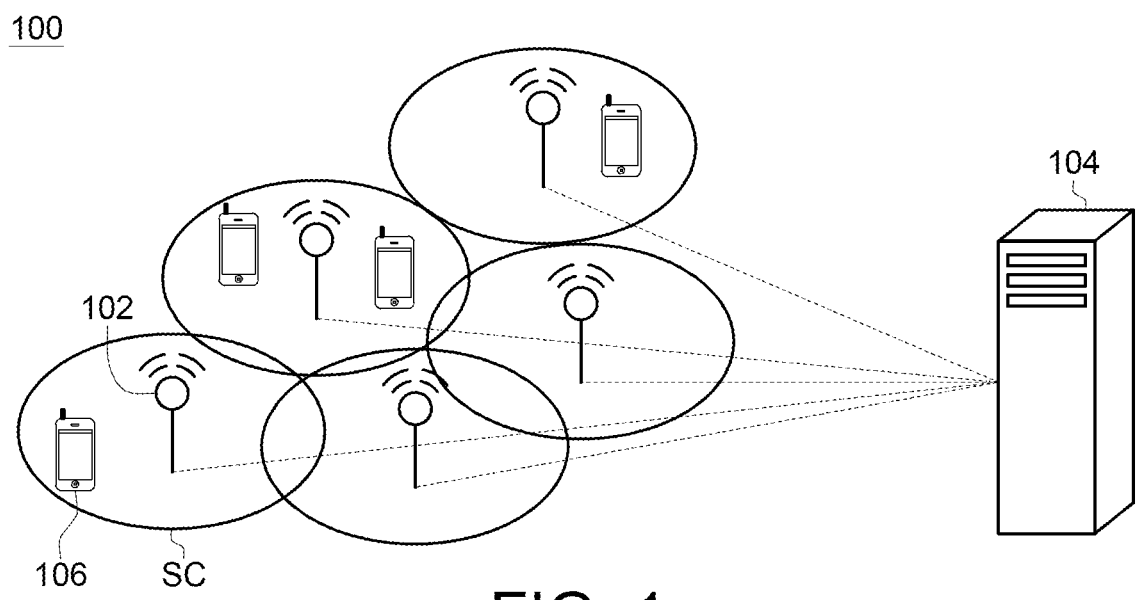
FIG. 1 is a schematic diagram showing a network 100 according to one embodiment of the present disclosure.

In the following detailed description, for purposes of explanation, numerous specific details are set forth in order to provide a thorough understanding of the disclosed exemplary embodiments. It will be apparent, however, that one or more exemplary embodiments may be practiced without these specific details. In other instances, well-known structures and devices are schematically shown in order to simplify the drawing.

DETAILED DESCRIPTION

Below, exemplary embodiments will be described in detail with reference to accompanying drawings so as to be easily realized by a person having ordinary knowledge in the art. The inventive concept may be embodied in various forms without being limited to the exemplary embodiments set forth herein. Descriptions of well-known parts are omitted for clarity, and like reference numerals refer to like elements throughout.

FIG. 1 is a schematic diagram showing a network 100 according to one embodiment of the present disclosure. The network 100 comprises a plurality of wireless communication device 102, such as Physical Access Points (PAPs), and a server 104. Each of the PAPs 102 is associated with a corresponding serving coverage SC, providing service to one or more stations (user/user equipment (UE)) 106 located therein. According to the deployment of the PAPs 102, the serving coverages SC of the PAPs 102 may overlap with each other or not. In the embodiment, the PAPs 102 can be controlled by a server 104 through a logical control channel (denoted by dashed lines in the figure). Note that the network configuration shown in FIG. 1 is just one way of implementing the present invention. The number of the station 106, PAP 102 and server 104 exemplified above are for description purpose only, not for limiting the invention, and may be adjusted to fit actual needs.

According to a wireless communication method, a wireless communication device and a non-transitory computer readable recording medium disclosed in examples, a station 106 in the network 100 can be provided with a Dedicated-and-Dynamic VAP (DD-VAP). The DD-VAP can be customized and configured by the server 104. By using the DD-VAP, the station 106 can use its station profile to access the network 100 and could reduce the latency of getting data service from the network.

Figure 2:
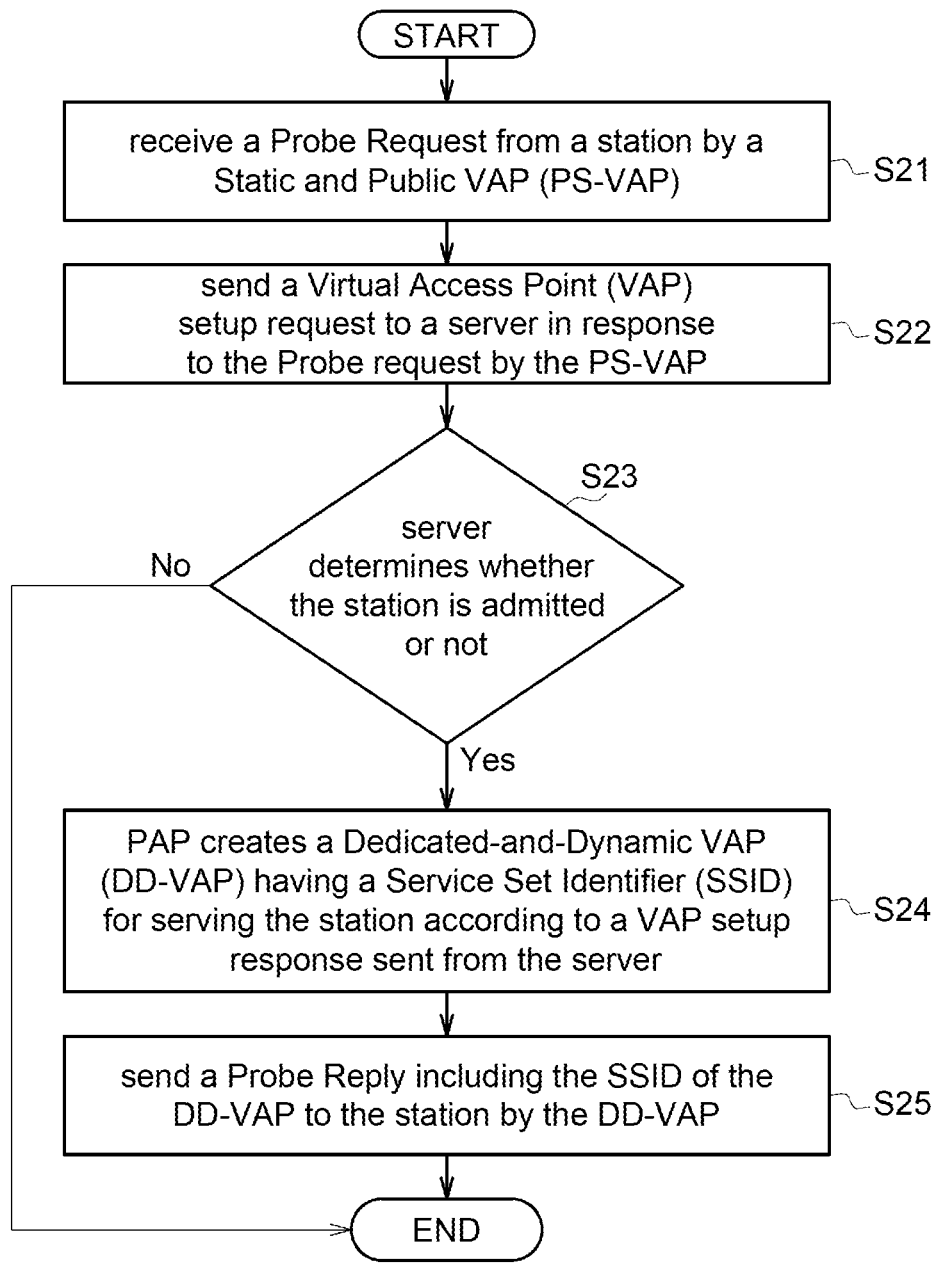
FIG. 2 is a flow chart showing a wireless communication method according to one embodiment of the present disclosure.

FIG. 2 is a flow chart showing a wireless communication method according to one embodiment of the present disclosure. In step S21, a Public-and-Static Virtual Access Point (PS-VAP) on a PAP (wireless communication device) 102 receives a probe request from a station 106. In step S22, the PS-VAP sends a VAP setup request to the server 104 in response to the probe request. In step S23, the server 104 determines whether the station 106 is admitted or not. If yes, step S24 is performed. The PAP 102 creates a DD-VAP having a Service Set Identifier (SSID) and preferred setting (station profile) for the station 106 according to a VAP setup response sent from the server 104. If not, the method goes to the end. In step S25, the created DD-VAP sends a probe reply including the SSID of the DD-VAP to the station 106.

Figure 3:
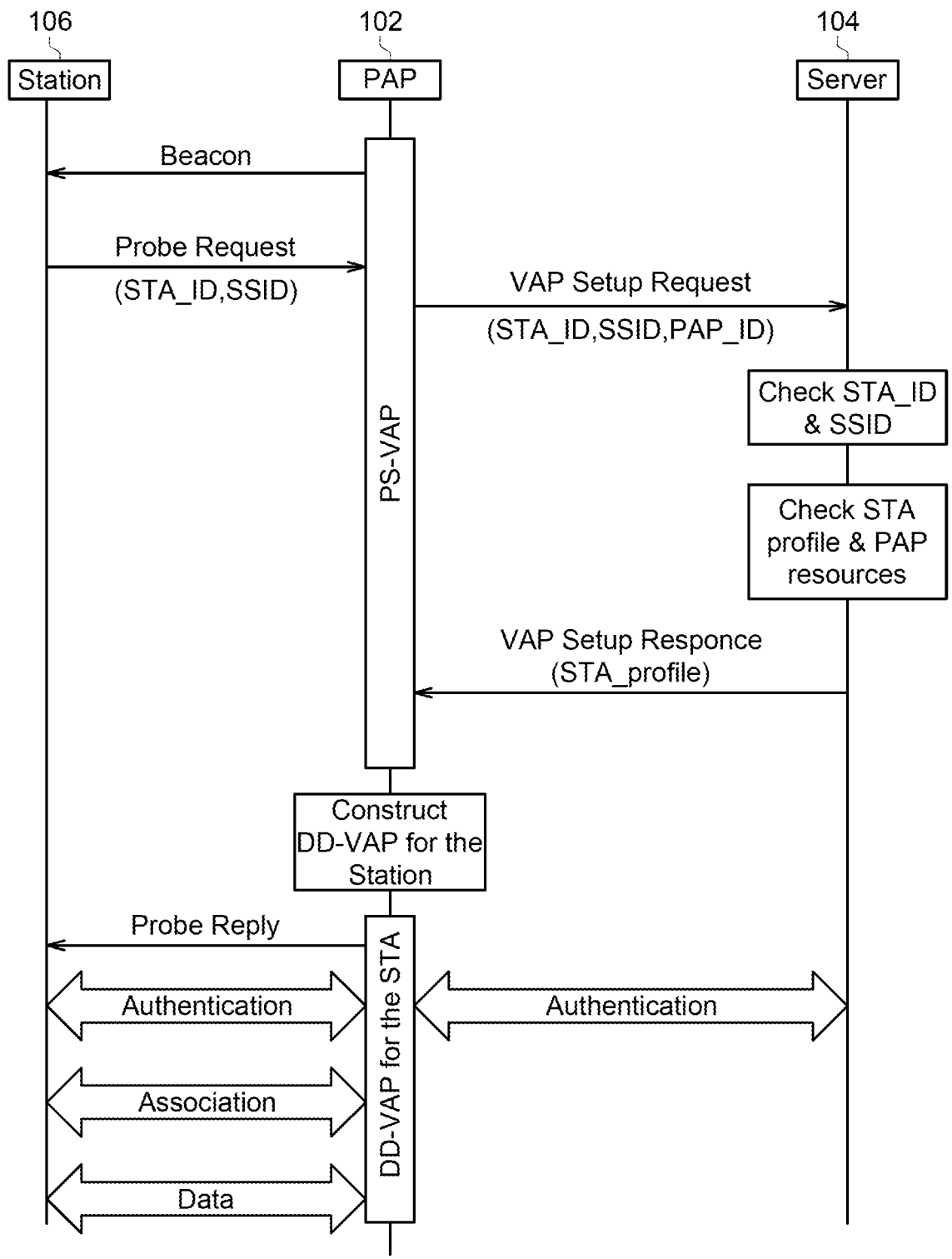
FIG. 3 is an exemplary message flow for illustrating the communication method shown in FIG. 2.

FIG. 3 is an exemplary message flow for illustrating the communication method shown in FIG. 2. As shown in FIG. 3, when the station 106 wants to access the network 100, the station 106 may listen on the control signal and wait for a beacon of a Public and Static VAP (PS-VAP). The PS-VAP is created on the PAP 102, allowing open access and being public to the station 106. If the station 106 hears the beacon of the PS-VAP, the station 106 knows that is an available PS-VAP. Then, the station 106 may send a probe request to the PS-VAP created on the PAP 102. The probe request comprises, for example, a SSID and an ID of the station 106 (e.g., Media Access Control (MAC) address of the station 106).

After receiving the probe request, the PS-VAP does not determine whether to reply the probe request by itself. Alternatively, the PS-VAP forwards the probe request to the server 104 by sending a VAP setup request to the server 104. The VAP setup request comprises, for example, the SSID comprised in the probe request, the ID of the station 106 and an ID of the PAP 102.

In one embodiment, the server 104 checks the VAP setup request to determine whether the station 106 is registered with the server 104 and whether current resources of the PAP 102 is enough to support the station 106. If the station 106 is registered with the server 104 and the current resources of the PAP 102 is enough to support the station 106, the server 104 sends the VAP setup response to the PAP 102. For example, the server 104 may check whether the station 106 is a valid registered station by using the SSID and the ID of the station 106. If the station 106 is a valid registered station, the server 104 reads the station profile (e.g., QoS requirement) of the station 106 and checks whether the current resources of the PAP 102 is enough to support the station 106. If yes, the server 104 replies the VAP setup response to the PS-PAP created on the PAP 102. The VAP setup response comprises, for example, the station profile of the station 106. The station profile can include, for example, the maximum/minimum data rate, latency constraints, preferred encryption method, routing table, scribed services and others. The PAP 102 creates the DD-VAP for the station 106 by using the station profile provided by the server 104. The created DD-VAP sends a probe reply to the station so that the station proceeds to authentication, association and data transmission with the created DD-VAP. Otherwise, the server 104 rejects the VAP setup request so that the PAP 102 does not create DD-VAP for the station 106 and does not reply probe response.

During the authentication, the DD-VAP created on the PAP 102 can be regarded as a relay node. The real authentication is done with the server 104. In one embodiment, a private station profile of the station 106 is not clone to the DD-VAP.

For better illustration, details of the creation, the management and the movement of a VAP are provided in the following sections.

Creation of VAP

Figure 4:
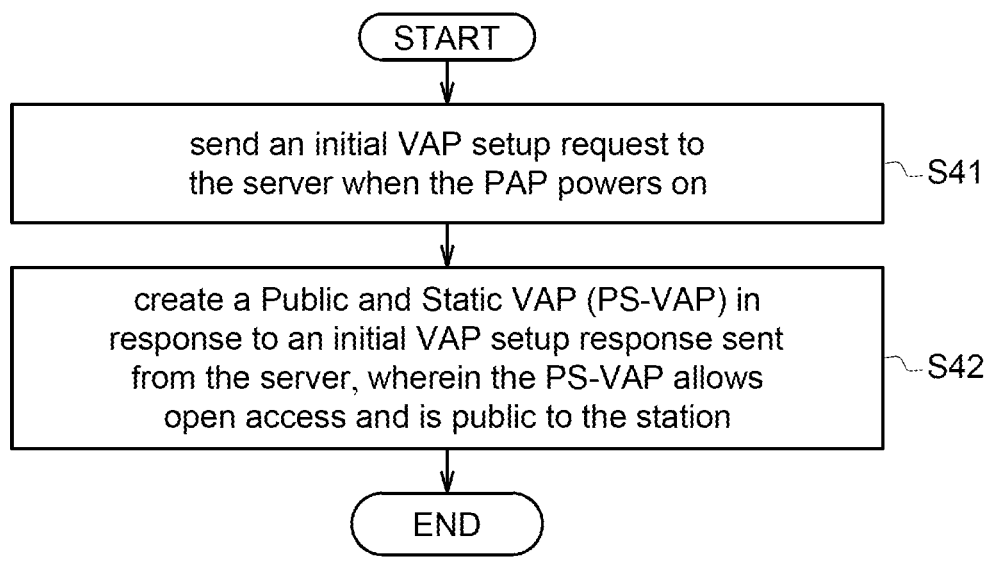
FIG. 4 is a flow chart showing a procedure for creating a PS-VAP on the PAP 102, according to an exemplary embodiment.
Figure 5:
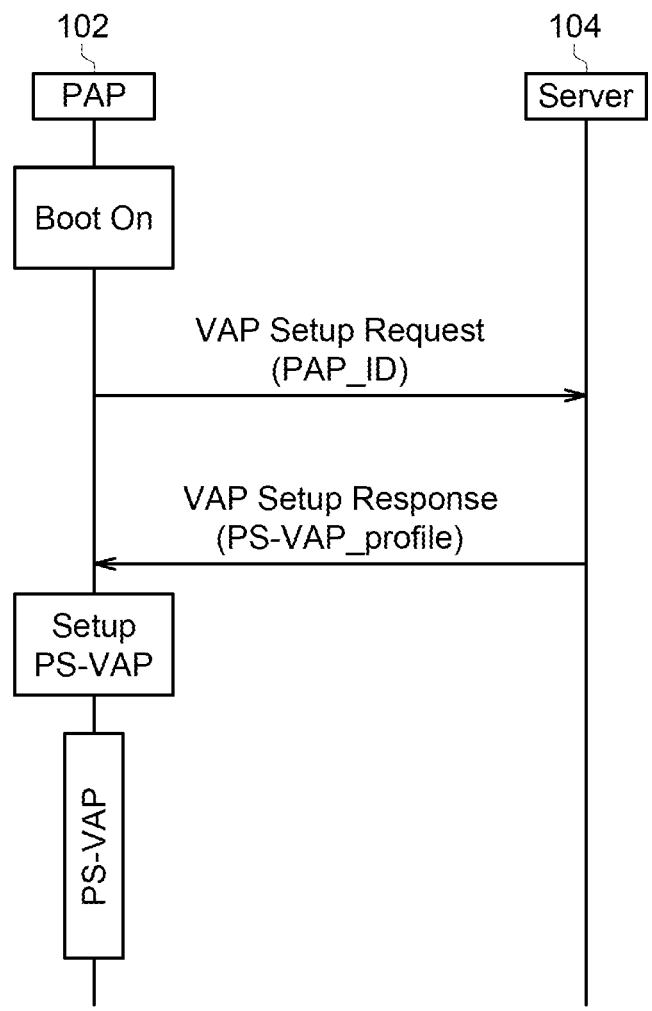
FIG. 5 is an exemplary message flow for illustrating the procedure shown in FIG. 4.

Refer to FIGS. 4 and 5. FIG. 4 is a flow chart showing a procedure for creating a PS-VAP on the PAP 102. FIG. 5 is an exemplary message flow for illustrating the procedure shown in FIG. 4.

In step S41, the PAP 102 sends an initial VAP setup request to the server 104 when the PAP 102 powers on. In step S42, the PAP 102 creates a PS-VAP in response to an initial VAP setup response sent from the server 104, wherein the PS-VAP allows open access and is public to any stations. After PS-VAP is created, other advanced services (e.g. network entry of stations, creating DD-VAP, DD-VAP management and movement) can be provided.

Specifically, as shown in FIG. 5, the PAP 102 may send an initial VAP setup request to the server 104 when the PAP 102 powers on. The server 104 replies an initial VAP setup response (e.g., PS-VAP profile, including the SSID and operating channel) to the PAP 102 so that the PAP 102 can create a VAP based on the configuration. The created VAP could be open access and public to any station without authentication. In one embodiment, the created VAP is the first created VAP on the PAP 102 and keeps alive until the PAP 102 powers off. In other words, the PS-VAP on the PAP 102 is cancelled when the PAP powers off. This kind of VAP is called PS-VAP. The server 104 assigns the same SSID and operating channel for all PS-VAPs so that all stations 106 at anywhere of the serving coverage SC of PAPs 102 could see one PS-VAP at least without the requirement of channel scanning for a specific SSID. The station already knows the channel of PS-VAP since the server has told the station the channel when the station successfully finishes the registration in an early phase. In the embodiment, the channel that PS-VAPs operate is named as a "control channel".

Figure 6:
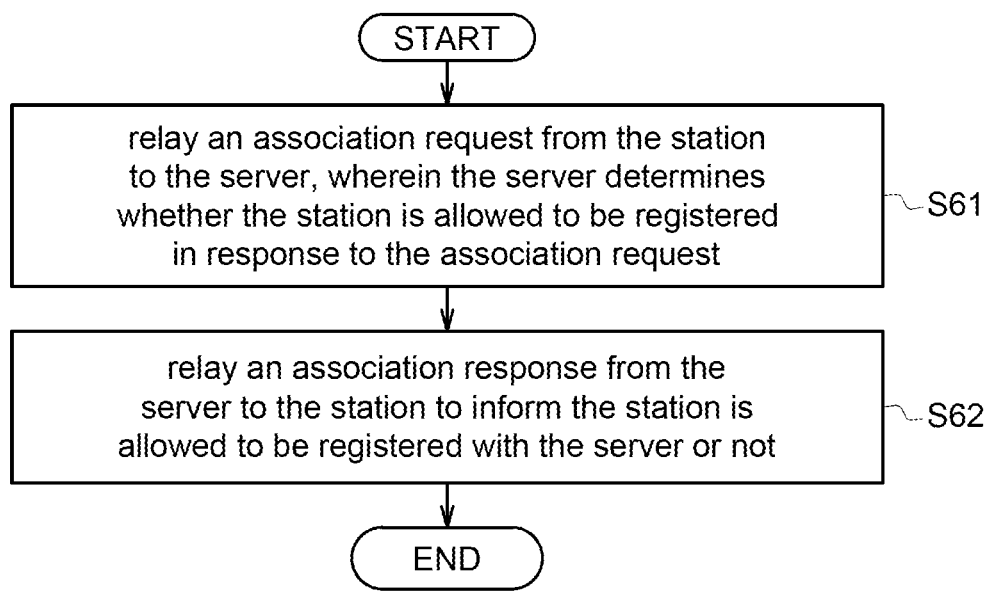
FIG. 6 is a flow chart showing a procedure for managing and registering the station 106, according to an exemplary embodiment.
Figure 7:
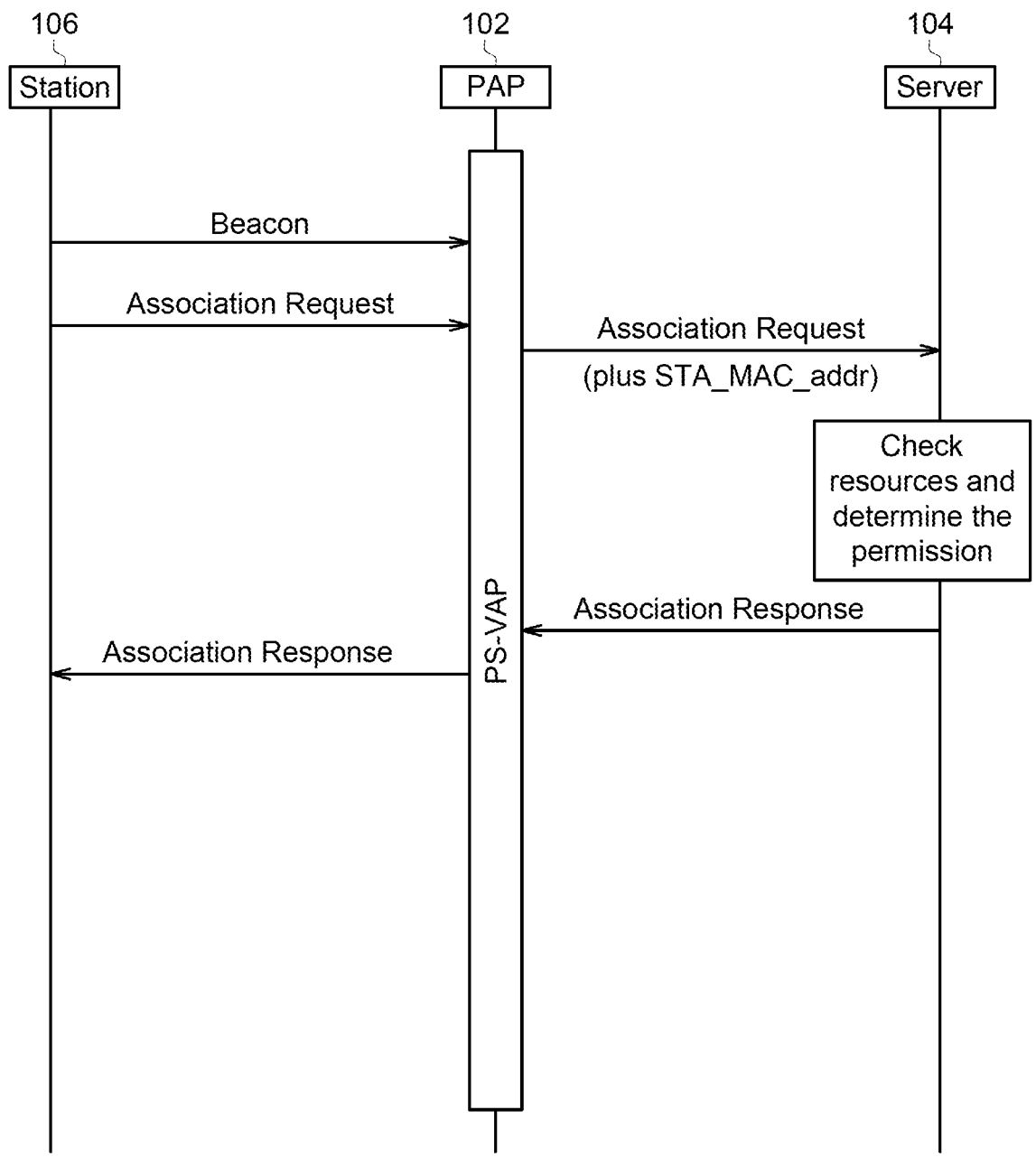
FIG. 7 is an exemplary message flow for illustrating the procedure shown in FIG. 6.

Refer to FIGS. 6 and 7. FIG. 6 is a flow chart of an embodiment showing a procedure for managing and registering of the station 106 through using the service of PS-VAP. FIG. 7 is an exemplary message flow for illustrating the procedure shown in FIG. 6.

In step S61, the PAP 102 relays an association request from the station 106 to the server 104, wherein the server 104 determines whether the station 106 is allowed to be registered in response to the association request. In step S62, the PAP 102 relays an association response from the server 104 to the station 106 to inform the station is allowed to be registered with the server or not.

Specifically, in the embodiment, network accessing of the stations 106 is managed by the server 104. There are two types of the stations 106: unregistered stations and registered stations. For unregistered stations 106, they can only access a PS-VAP. As shown in FIG. 7, when an unregistered station 106 wants to use the PS-VAP, the PS-VAP on the PAP 102 may relay the attempt, i.e., the association request, to the server 104. The association request comprises, for example, the MAC address of the station 106. The server 106 checks the current loading the network 100 and determines whether the unregistered station 106 is allowed to enter the network 100 or not. If the station 106 is allowed, the server 104 would log the station 106 and could reduces the available resources by N (for example one). If the available resources for the unregistered stations 106 run out, the server 106 will reject the unregistered stations 106. For registered stations 106, the server 104 would create a DD-VAP for a registered station 106.

In one embodiment, the account and profile of a registered station 106 can be managed by the server 104. The station profile comprises, for example, the SSID, authentication method and key, QoS requirement and other preferred setting for the DD-VAP of the registered station 106. When a station 106 wants to register with the server 104, the station 106 has to provide its MAC address and SSID of the DD-VAP at least. The server 104 then uses the MAC address and SSID to generate the key to access its database and also generate the Basic Service Set Identification (BSSID) for the DD-VAP of the station 106. In one embodiment, the generated BSSID would be the MAC address of the DD-VAP when communicating with the station 106.

The procedure of station registration can be done through various communication methods with the server 104, e.g. through wired backhaul and/or wireless access network. In one embodiment, as shown in FIG. 7, an unregistered station 106 can become registered by using the PS-VAP on the PAP 102. In other words, an unregistered station 106 can first connect with a PS-VAP so that the station 106 can create a communication section (e.g. through https). Once the station 106 can have a communication section with the server 104, the station 106 can execute the registration with the server 104 and become a registered station 106.

Management of VAP (I) Measurement and Reconfiguration

Figure 8:
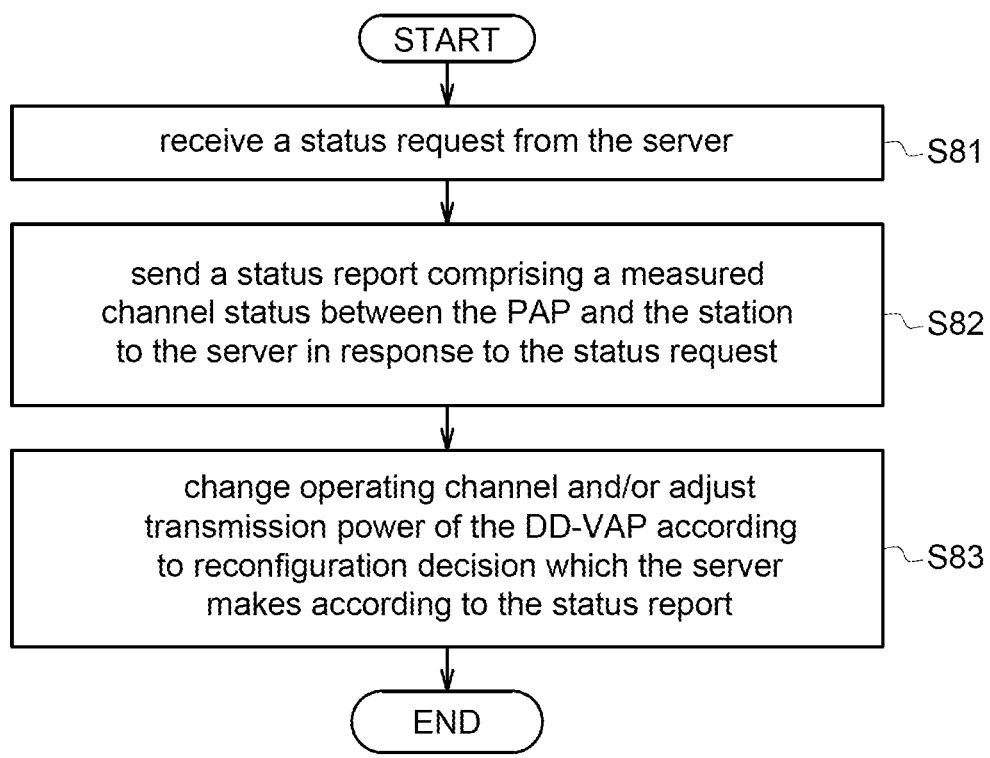
FIG. 8 is a flow chart showing a procedure for managing and reconfiguring of a DD-VAP on the PAP 102, according to an exemplary embodiment.
Figure 9:
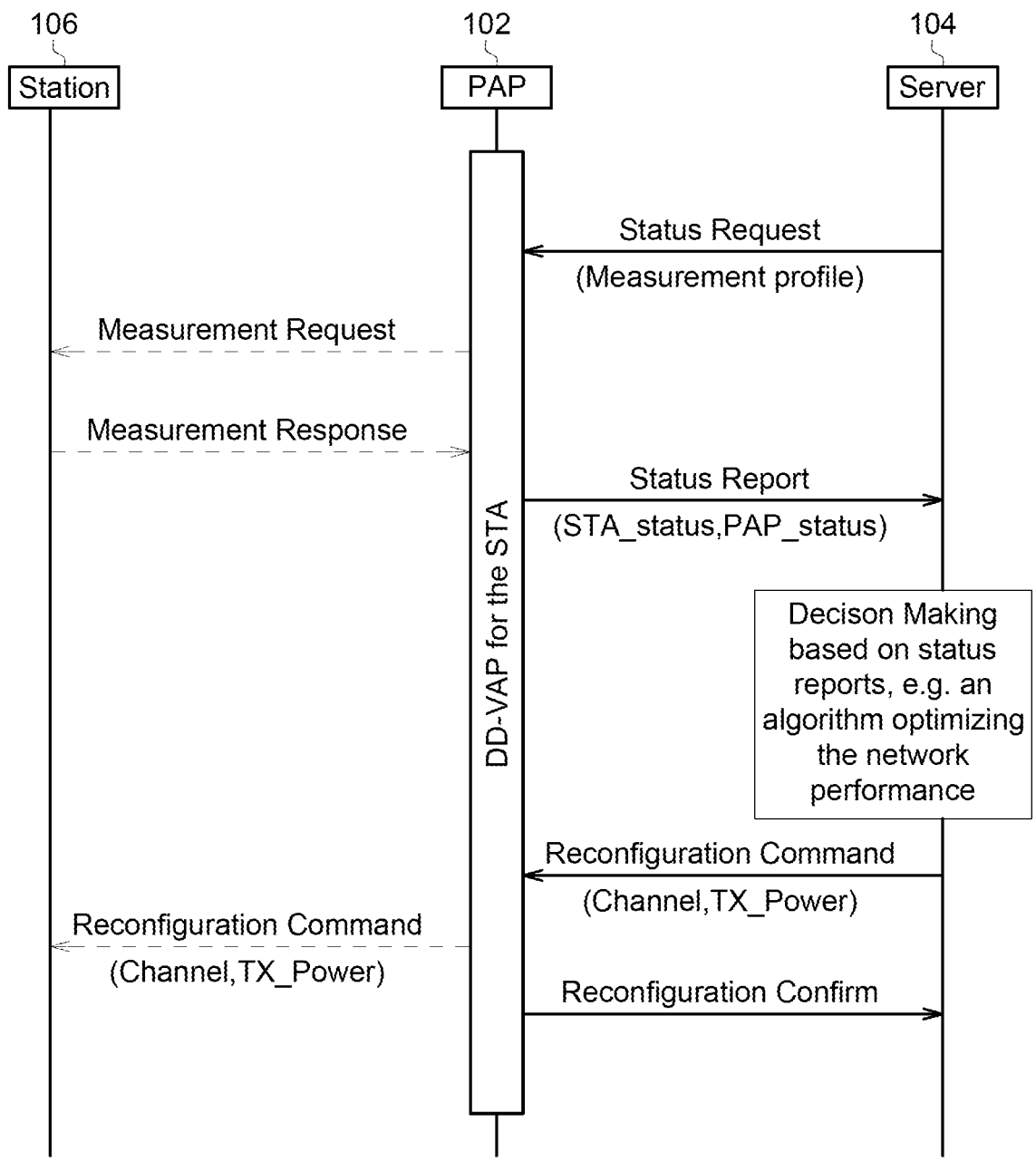
FIG. 9 is an exemplary message flow for illustrating the procedure shown in FIG. 8.

Refer to FIGS. 8 and 9. FIG. 8 is a flow chart showing a procedure for managing and reconfiguring of a DD-VAP on the PAP 102. FIG. 9 is an exemplary message flow for illustrating the procedure shown in FIG. 8.

In step S81, the PAP 102 receives a status request from the server 104. In step S82, the PAP 102 sends a status report comprising a measured channel status between the DD-VAP and the station 106 to the server 104 in response to the status request. In step S83, the PAP S83 changes operating channel and/or adjusting transmission power of the DD-VAP in response to a reconfiguration decision which the server 104 makes according to the status report. Since one DD-VAP is dedicated to one station, the server can optimizes the network in the unit of one station, finer granularity than conventional APs.

As shown in FIG. 9, in one embodiment, the server 104 uses a status request which comprises a profile for a DD-VAP and/or the corresponding station 106 to measure the channel status, including the channels to be measured and measurement items (e.g. background noise, interference and packet loss rates). If the status request comprises the parts that require the station 106 to cooperate or the DD-VAP on the PAP 102 does not has the queried data, the DD-VAP sends a measurement request to ask the station 106 measurement results of channel status between the DD-PAP 102 and the station 106. The format of the measurement request can follow the existing messages in IEEE 802.11 so that the station 106 does not require modification. The measurement response comprising the measurement results from the station 106 does, too. After the DD-VAP on the PAP 102 collects the queried data, the DD-VAP generates the status report according to the measurement results obtained from the station 106 and sends the status report to the server 104, including the status from the station 106 and the PAP 102. In another embodiment, when receiving the status request from the server 104, the PAP 102 can measure the channel status by itself and dose not need to send the measurement request to the station 106. For example, the PAP 102 can estimate the channel status between the DD-VAP and the station 106 by detecting ACK messages in data transmission with the station 106.

In the embodiment, the server 104 can know the radio environment through the status report and then use it to make a reconfiguration decision (which aims to optimize the network performance). As shown in FIG. 9, the server 104 sends a reconfiguration command to the DD-VAP on the PAP 102. The reconfiguration command comprises the made reconfiguration decision, such as changing operating channel and/or adjusting transmission power. After the new setting is executed, the DD-VAP replies a reconfiguration confirm to the server 104. In one embodiment, if the reconfiguration decision involves the station 106, the DD-VAP may forward the reconfiguration command to the station 106.

(II) Channel Switch

Figure 10:
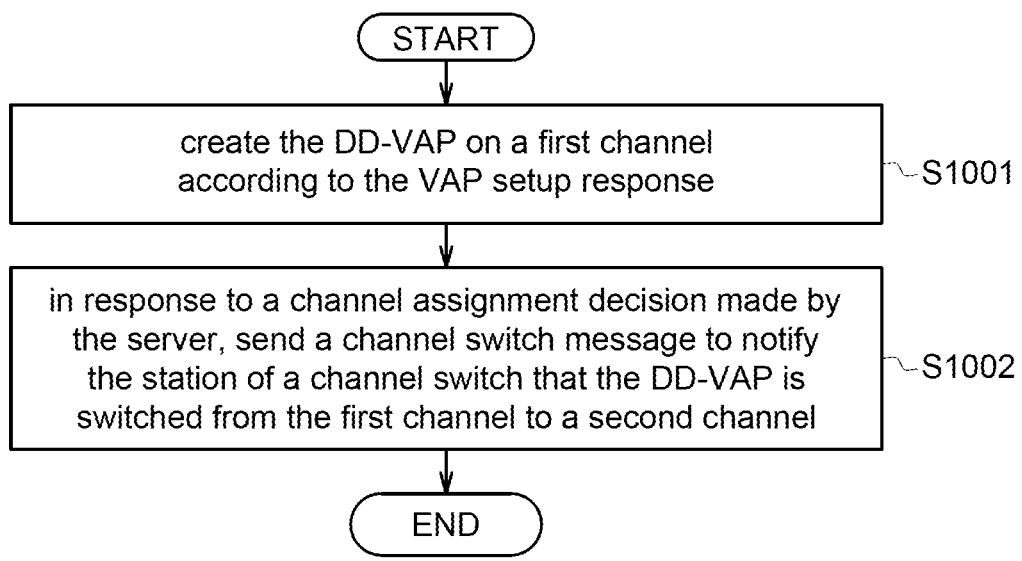
FIG. 10 is a flow chart showing a procedure for switching the operating channel of the DD-VAP on the PAP 102, according to an exemplary embodiment.
Figure 11:
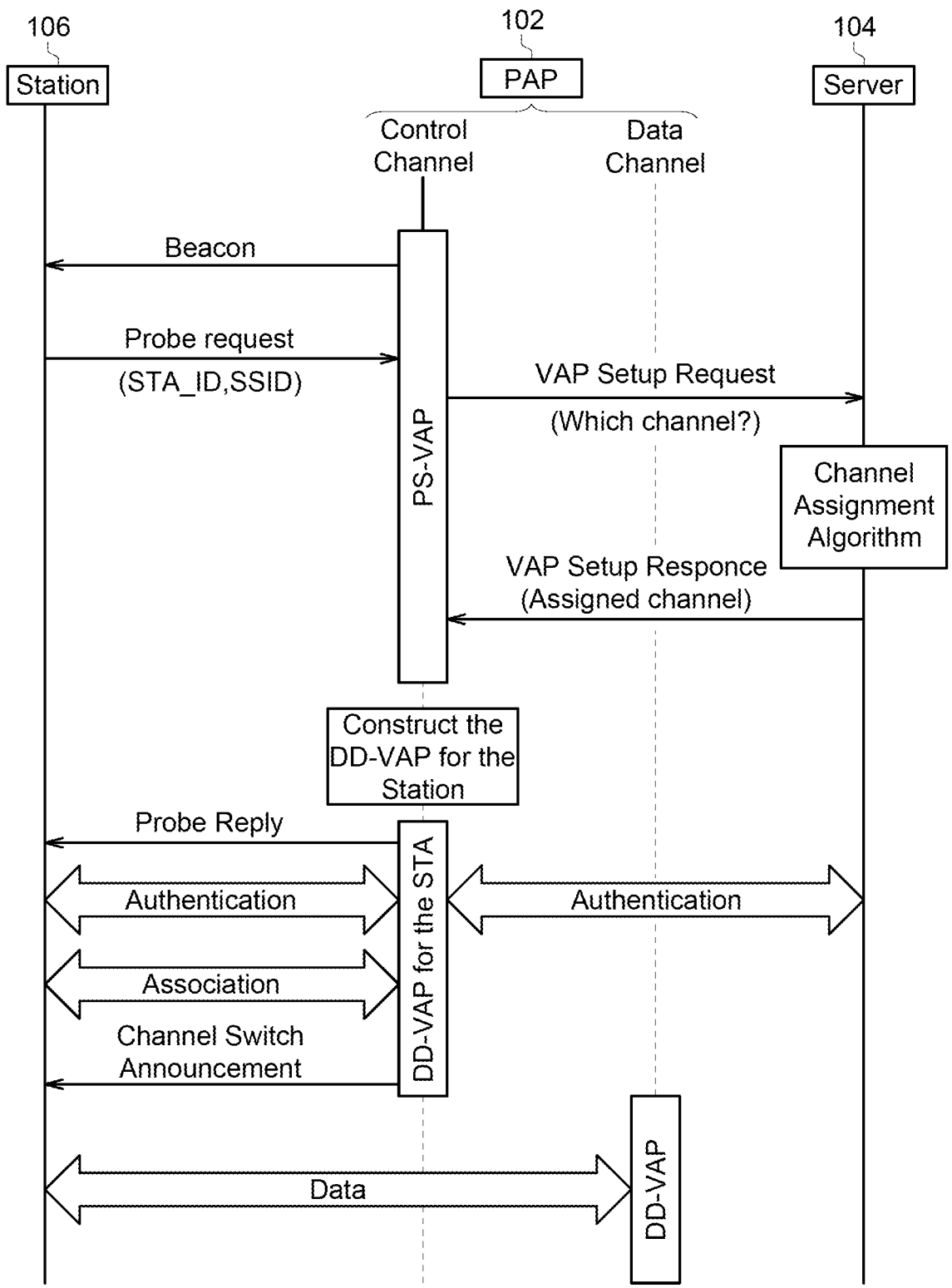
FIG. 11 is an exemplary message flow for illustrating the procedure shown in FIG. 10.

Refer to FIGS. 10 and 11. FIG. 10 is a flow chart showing a procedure of one embodiment for switching the operating channel of the DD-VAP on the PAP 102. FIG. 11 is an exemplary message flow for illustrating the procedure shown in FIG. 10.

In step 1001, the PAP 102 creates a DD-VAP on a first channel according to the VAP setup response. In step 1002, the DD-VAP on the PAP 102 sends, in response to a channel assignment decision made by the server 104, a channel switch message to notify the station 106 of a channel switch that the DD-VAP is switched from the first channel to a second channel.

As shown in FIG. 11, when the station 106 sends a probe request to the PS-VAP on the PAP 102, the PS-VAP sends a VAP setup request which comprises a query of channel assignment to the server 104. When the server 104 receives the query of channel assignment, the server 104 executes a channel assignment algorithm (e.g., checking a look up table) that considers both the operating channel and operating timing of neighbor DD-VPAs. After an operating channel is determined, the server notifies the PS-VAP through the VAP Setup Response. Initially, the DD-VAP for the station 106 is still created on the control channel (which the PS-VAP operates). After the procedure of association is done, the DD-VAP uses a channel switch message in a beacon to notify the station of the channel switch. The channel switch message can be, for example, a Channel Switch Announcement (CSA) message. The CSA message is a standard message in the IEEE 802.11 Beacon message, and is a broadcast message so that all stations 106 associated with the DD-VAP on the PAP 102 would switch the operating channel. In one embodiment, a DD-VAP created by the PAP 102 serves one station 106. That is, the number of stations serving by a DD-VAP is one. Thus, the PAP 102 can perform customized channel switch for each station 106 associated with it.

In the embodiment, the channel switch during DD-VAP operating follows the similar procedure as stated in the Sec. (I) Measurement and Reconfiguration. The event of channel switch is also notified through the CSA in a Beacon, for example.

(III) Scheduling of VAPs

Figure 12A:
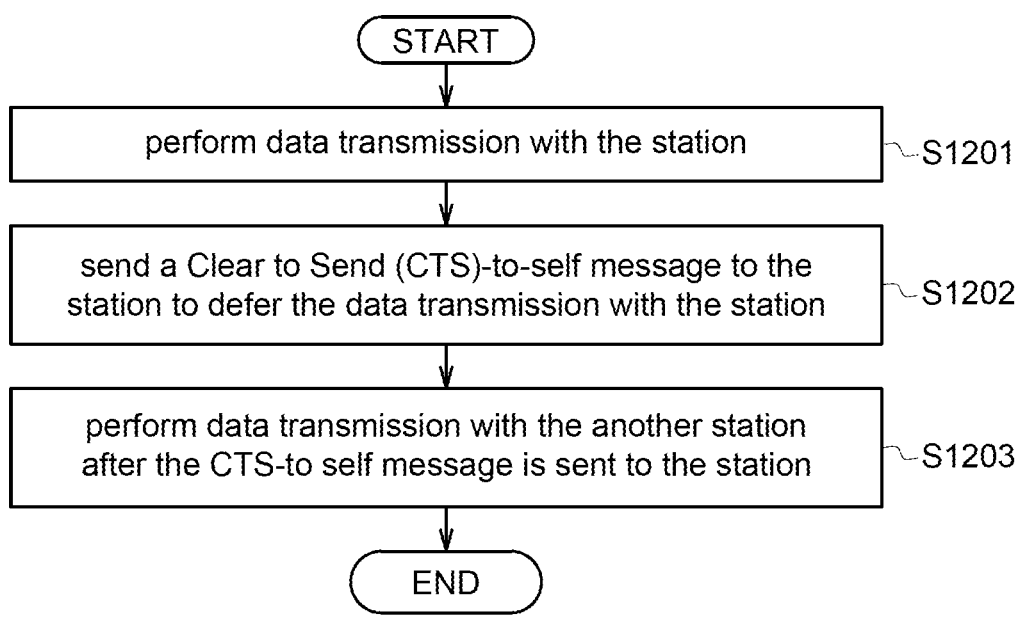
FIG. 12A is a flow chart showing a procedure for scheduling the VAPs according to an exemplary embodiment.

FIG. 12A is a flow chart showing a procedure for scheduling the VAPs according to an exemplary embodiment. In step S1201, a DD-VAP of a station 106A on the PAP 102 performs data transmission with a station 106A. In step S1202, the DD-VAP of the station 106A on the PAP 102 sends a Clear to Send (CTS)-to-Self message to the station 106A to defer the data transmission with the station 106A. In step S1203, the PAP 102 plays the DD-VAP of another station 106B and performs data transmission with the station 106B after the CTS-to-Self message is sent to the station 106A.

Figure 12B:
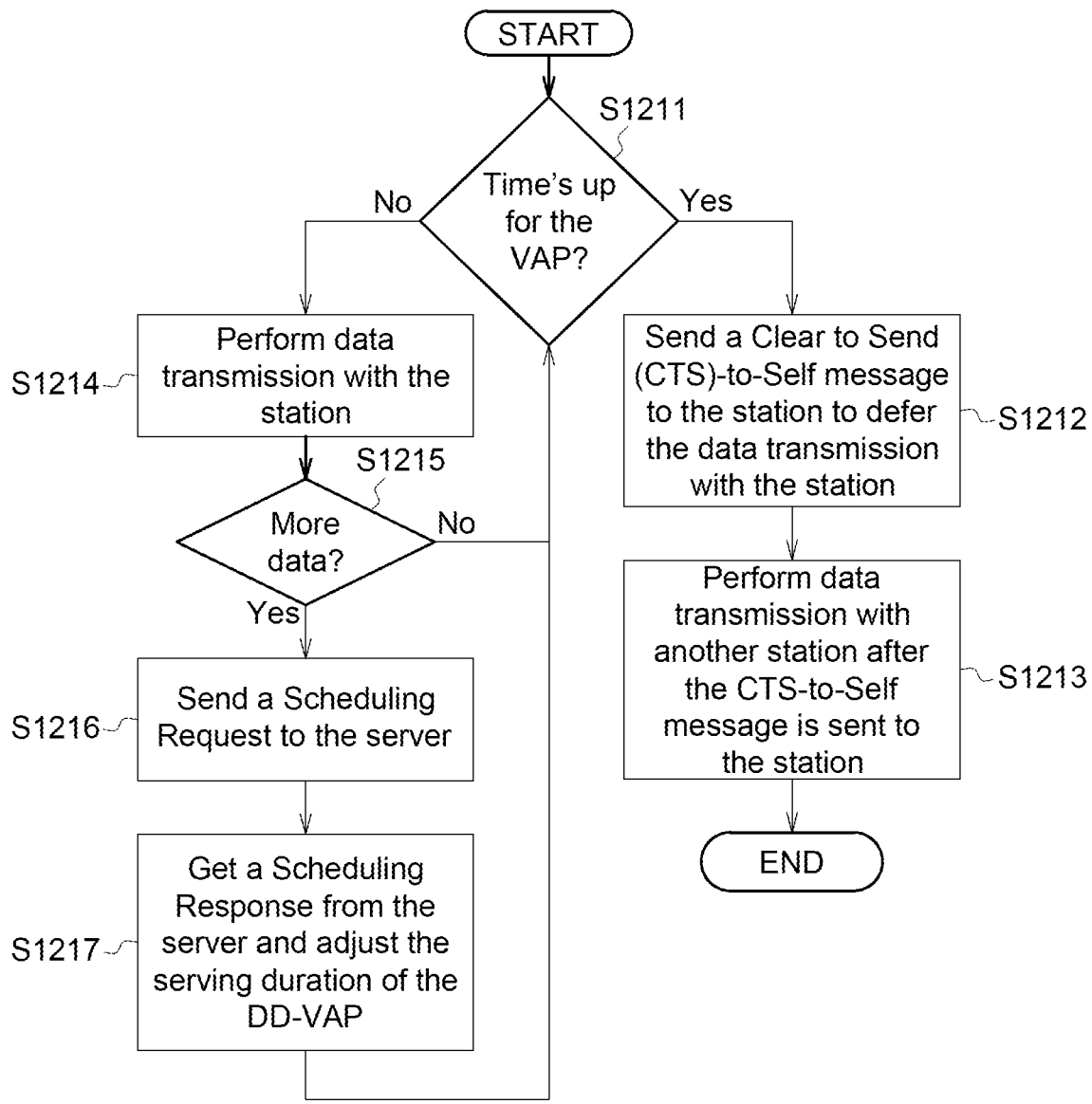
FIG. 12B is a flow chart showing an exemplary procedure for scheduling the VAPs according to one embodiment of the present disclosure.

FIG. 12B is a flow chart showing an exemplary procedure for scheduling the VAPs according to one embodiment of the present disclosure. At step S1211, the PAP 102 playing a VAP (DD-VAP or PS-VAP) may check its schedule to determine whether time is up for the VAP. If time of playing the VAP is up, the PAP 102 plays another VAP. As shown in FIG. 12B, the PAP 102 may send a CTS-to-Self message to the station to defer the data transmission with the station (step S1212), then performing data transmission with another station after the CTS-to-Self message (step S1213). Otherwise, the PAP 102 continues to play the VAP. As shown in FIG. 12B, the PAP 102 may perform data transmission with the station (step S1214), and determine whether there is more data to sent (step S1215). If yes, the PAP 102 may send a Scheduling Request to the server 104 (step S1216), and adjust the serving duration of the DD-VAP after getting a Scheduling Response from the server 104 (step S1217). If not, the procedure goes back to step S1211 to determine whether time is up for the VAP again.

Figure 13:
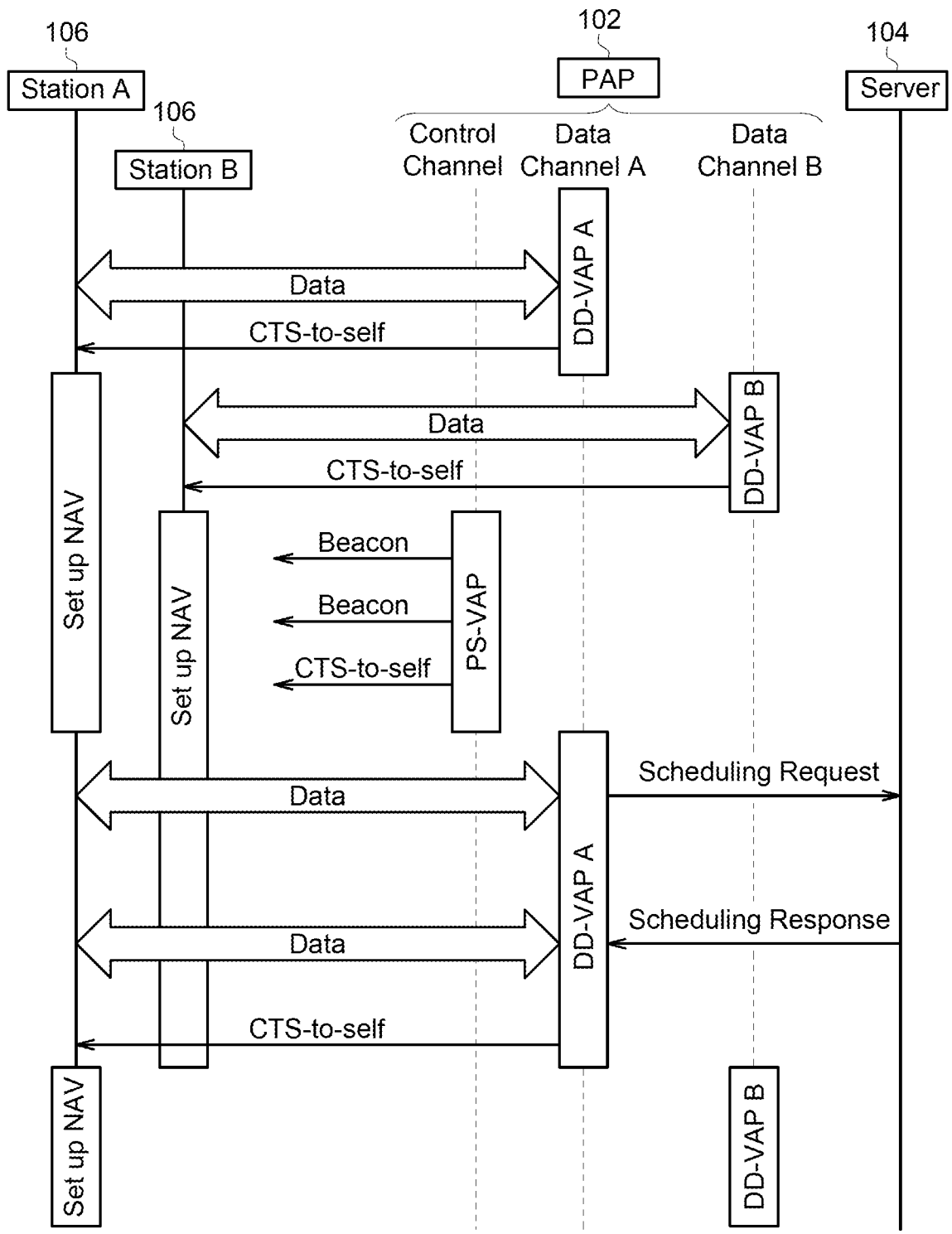
FIG. 13 is an exemplary message flow for illustrating a procedure of VAP scheduling according to an exemplary embodiment.

As mentioned earlier, before the PAP 102 plays another VAP, the playing VAP on the PAP 102 may send out a CTS-to-Self message. The destination of CTS-to-Self message is the MAC address of the VAP. The CTS-to-Self message comprises, for example, a Network Allocation Vector (NAV) that specifies how long the VAP is busy. In other words, the CTS-to-Self message can indicate a duration that the VAP (DD-VAP A/DD-VAP B) is not available for the station 106 (106A/106B). When the station 106 (106A/106B) receives the CTS-to-Self message, the station 106 (106A/106B) sets up a timer as long as the NAV of the CTS-to-Self message. The station 106 (106A/106B) would keep silent and defer data transmissions until the timer expires. As shown in FIG. 13, the PAP 102 creates a PS-VAP, a DD-VAP A for station 106A and a DD-VAP B for station 106B. A CTS-to-Self message is sent by the DD-VAP A on the PAP 102 before the PAP 102 switches to another DD-VAP, e.g. DD-VAP B or PS-VAP. In the view of station 106A, the NAV timer is set as long as its DD-VAP (i.e., DD-VAP A) leaves for other services, including playing as the PS-VAP or the DD-VAP B of station 106B.

In one embodiment, the time resource of the PAP 102 is shared by all VAPs (e.g., PS-VAP and all DD-VAPs) created on the PAP 102. The time ratio that a VAP can use is scheduled by the server 104 so that channel congestion, interference between neighbor VAPs is minimized as much as possible. If a DD-VAP or the corresponding station 106 (e.g. station 106A in FIG. 13) has more data to send, the DD-VAP can send a scheduling request to the server 104. In one embodiment, the scheduling request implies the increase/decrease of the time ratio of a VAP and asks the server 104 to re-optimize the schedule of VAPs. When a PAP receives a scheduling response, the PAP should adjust its schedule of playing VAPs according to the scheduling response.

Movement of VAP

Figure 14A:
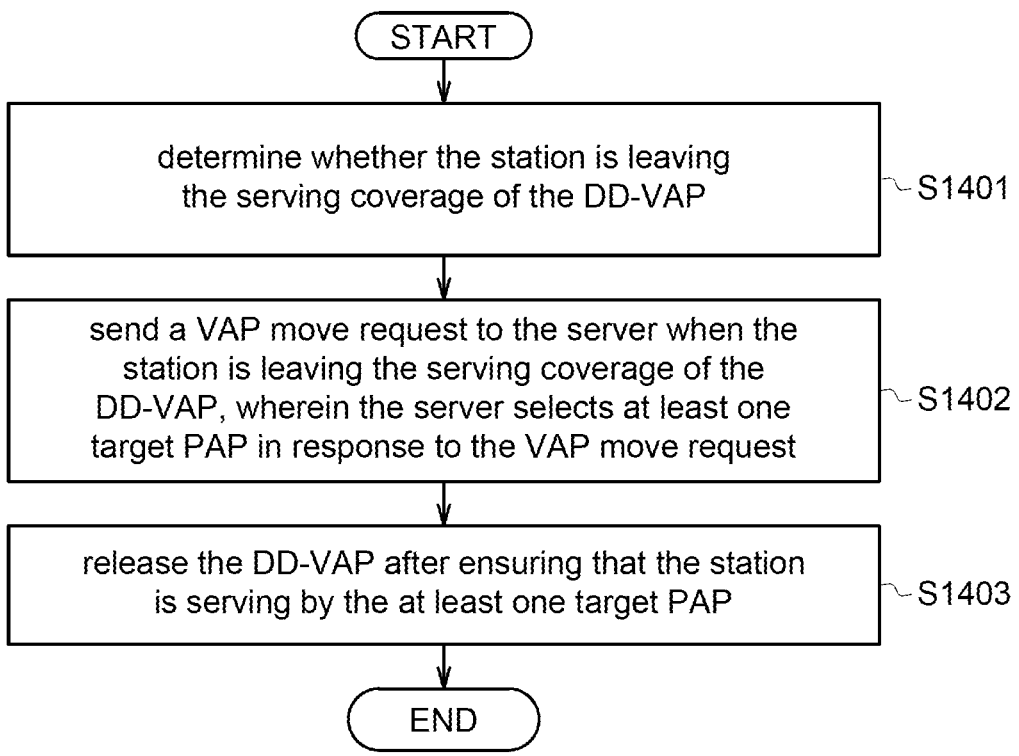
FIG. 14A is a flow chart showing a procedure of the movement of VAPs according to an exemplary embodiment.
Figure 14B:
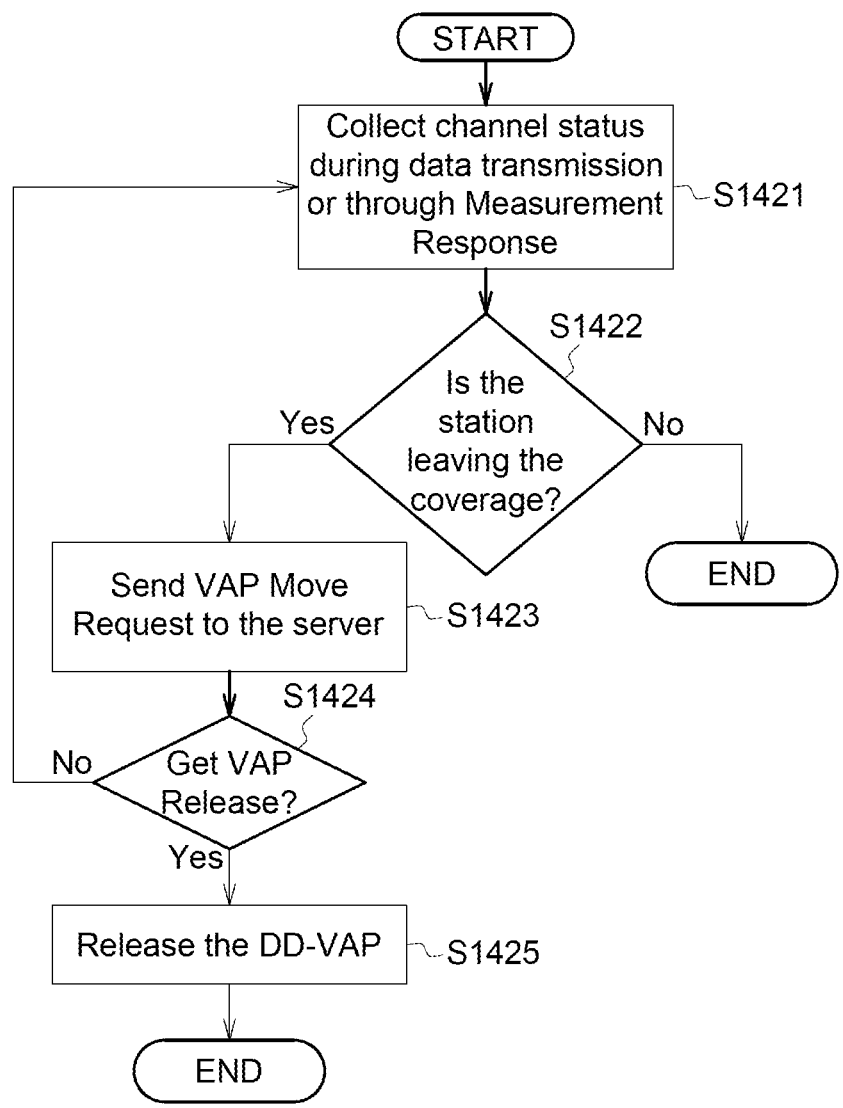
FIG. 14B is a flow chart showing a procedure of the movement of VAPs from the perspective of a PAP according to an exemplary embodiment.
Figure 14C:
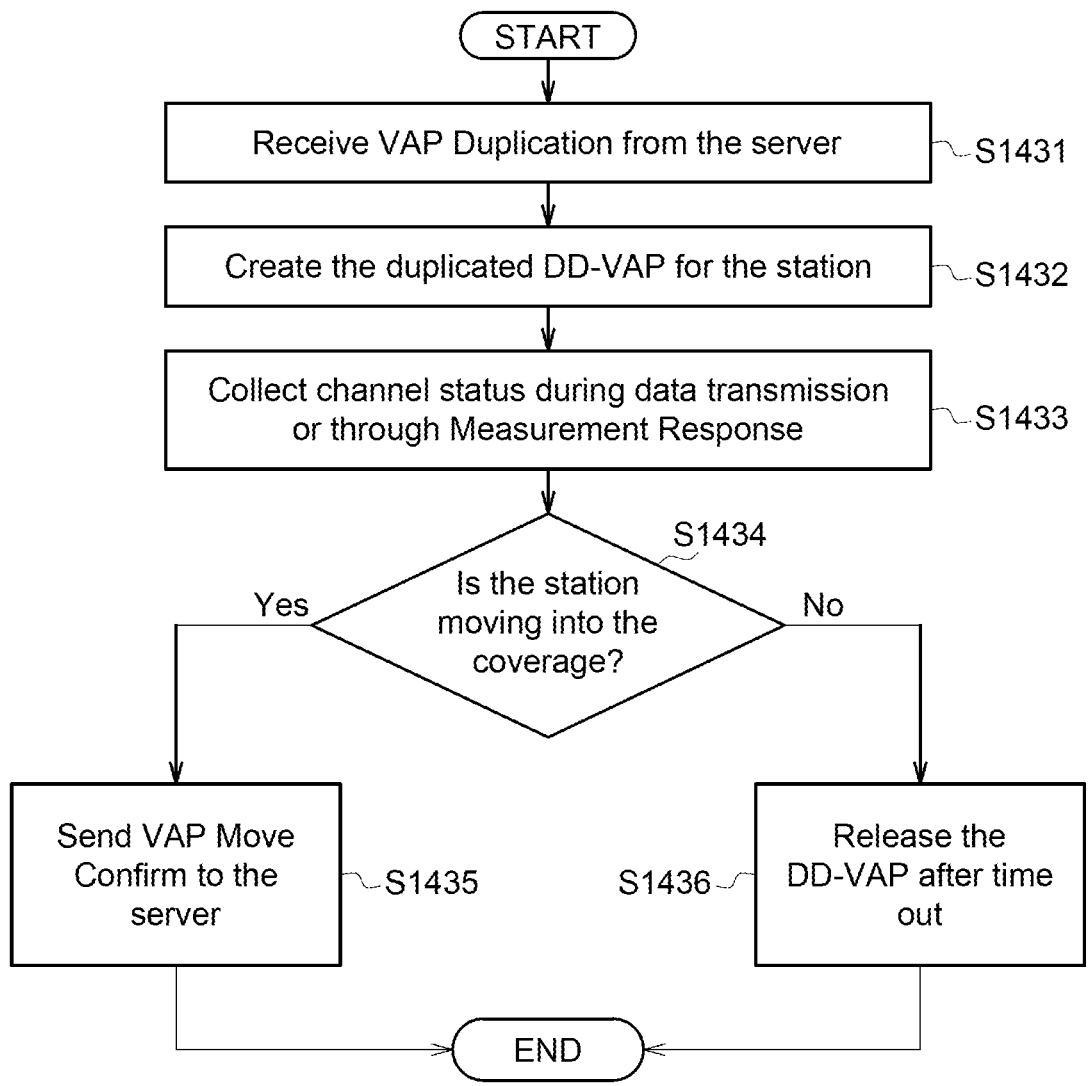
FIG. 14C is a flow chart showing a procedure of the movement of VAPs from the perspective of another PAP according to an exemplary embodiment.
Figure 14D:
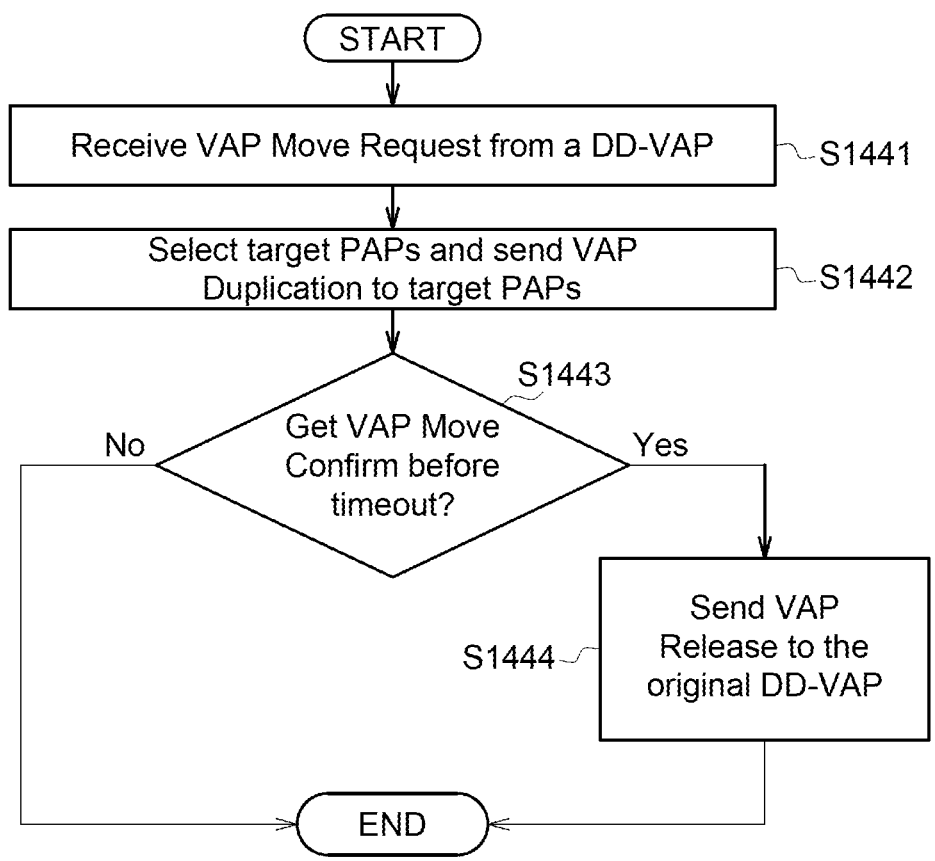
FIG. 14D is a flow chart showing a procedure of the movement of VAPs from the perspective of the server according to an exemplary embodiment.
Figure 15:
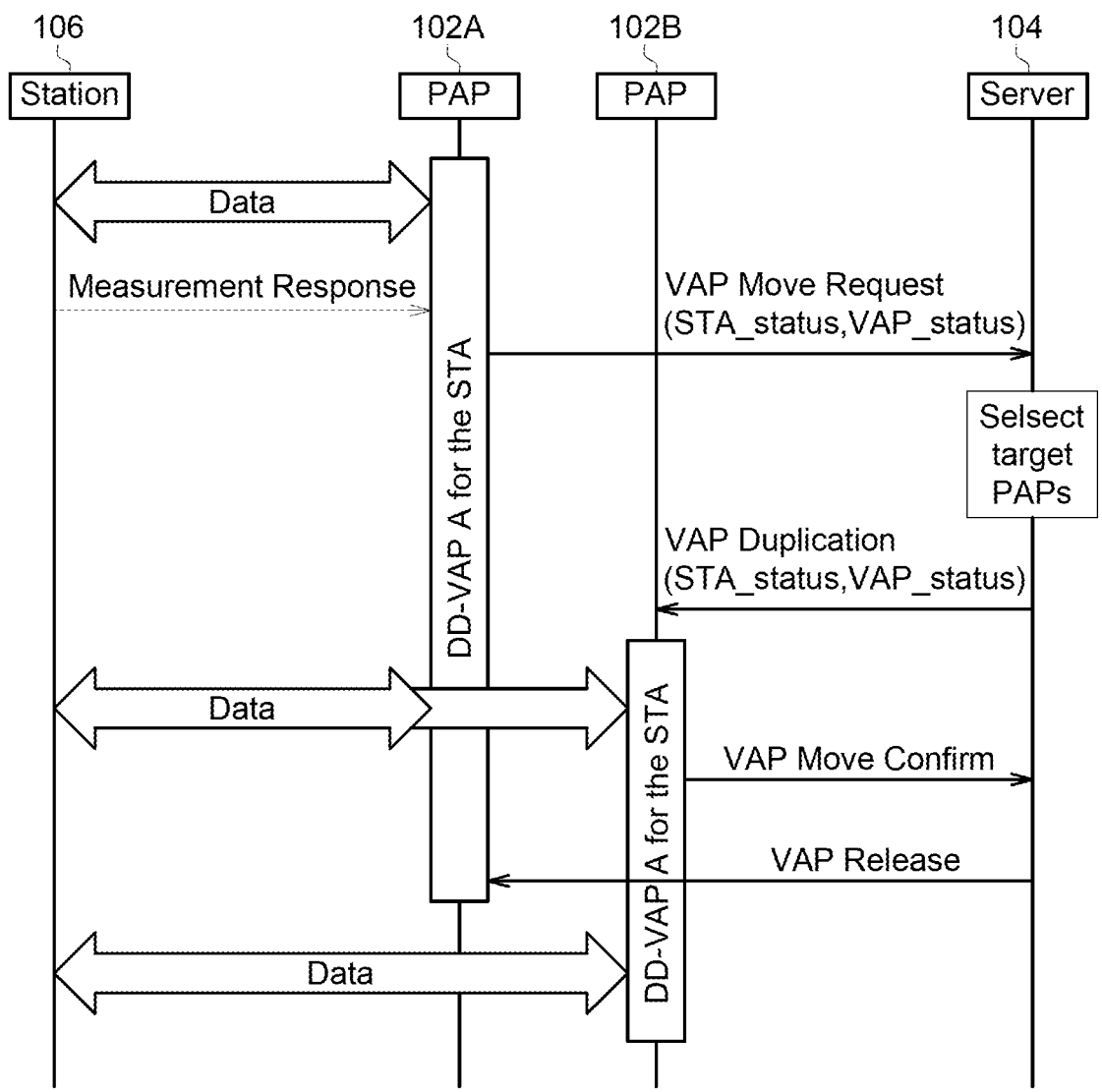
FIG. 15 is an exemplary message flow for illustrating the movement procedure of VAPs.

Refer to FIGS. 14 and 15. FIG. 14 is a flow chart showing a procedure of the movement of VAPs. FIG. 15 is an exemplary message flow for illustrating the procedure shown in FIG. 14.

In step S1401, a PAP 102 (102A/102B) determines whether the station 106 is leaving the serving coverage SC of the PAP 102. In step S1402, the PAP 102 sends a VAP move request to the server 104 when the station 106 is leaving the serving coverage SC of the PAP 102, wherein the server 104 may select at least one target PAP in response to the VAP move request. In step S1403, the PAP 102 releases the DD-VAP, which is determined not to serve the station 106, after the server 104 ensures that the station 106 is serving by the at least one target PAP.

FIG. 14B is a flow chart showing a procedure of the movement of VAPs from the perspective of a PAP (102A)

according to an exemplary embodiment. At step S1421, the PAP 102A collects channel status during data transmission or through Measurement Response. At step S1422, the PAP 102A determines whether the station 106 is leaving its coverage or not. If yes, the PAP 102A may send a VAP Move Request to the server 104 (step S1423). The PAP 102A checks whether to get a VAP Release message from the server 104 (step S1424). If yes, the PAP 102A releases the DD-VAP for the station (step S1425).

FIG. 14C is a flow chart showing a procedure of the movement of VAPs from the perspective of another PAP (102B) according to an exemplary embodiment. As shown in FIG. 14C, after the PAP 102B receives a VAP Duplication message from the server 104 (step S1431), the PAP 102B may create a duplicated DD-VAP for the station 106 (step S1432) and collect channel status during data transmission or through Measurement Response (step S1433). The PAP 102B then determines whether the station is moving into its coverage (step S1434). If yes, the PAP 102B may send a VAP Move Confirm to the server 104 to confirm the movement of the station 106 (step S1435). If not, the PAP 102B may release the DD-VAP prepared for the station 106 after time out (step S1436).

FIG. 14D is a flow chart showing a procedure of the movement of VAPs from the perspective of the server 104 according to an exemplary embodiment. At step S1441, the server 104 receives a VAP Move Request from a DD-VAP on the PAP 102A. Afterwards, the server 104 selects at least one target PAP (e.g., the PAP 102B) and sends a VAP Duplication message to the at least one target PAP 102B (step S1442). Then, the server 104 checks whether to get a Move Confirm form the at least one target PAP 102B before timeout (step S1443). If yes, the server 104 sends a VAP Release to the original DD-VAP on the PAP 102A to release the original DD-VAP (step S1444).

FIG. 15 is an exemplary message flow for illustrating the movement procedure of VAPs. As shown in FIG. 15, assume that a station 106 is connecting with a PAP 102A initially. The DD-VAP for the station 106 can be aware of the signal quality between itself and the station 106 through data transmission and acknowledgement. If data transmission is not frequent, the DD-VAP can also get the channel status through the measurement response sent from the station 106. If the DD-VAP finds that the station 106 may leave the coverage of the PAP 102A, the DD-VAP sends a VAP move request to the server 104. The VAP move request comprises, for example, the station status, VAP status and other enough information for the server 104 to determine one or several possible target PAPs. For instance, if at least one PAP 102B is selected by the server 104 as a target PAP, the server 104 may send a VAP duplication message comprising context of the DD-VAP on the PAP 102A to the at least one target PAP 102B in response to the VAP move request. The VAP duplication message comprises, for example, BSSID, the operating channel and timing, frame sequence number and ACK/NACK status. The PAP 102B follows the VAP duplication message and creates a clone DD-VAP for serving the station 106 according to the VAP duplication message. Afterwards, there are two the same DD-VAPs on the same channel at the same time. Data to/from the station 106 are sent/received by both of the DD-VAPs. For example, the upper layers (for example TCP or UDP) could discard duplicated packets for application layers. The DD-VAP on PAP 102B continues to monitor the status of the station 106 either through data transmission or measurement responses. Once the DD-VAP on PAP 102B finds that the station 106 stably enters into the serving coverage SC of PAP 102B, the DD-VAP on PAP 102B sends a VAP move confirm to the server. If the DD-VAP on PAP 102B does not find out the station after time is up, the DD-VAP on PAP 102B is released. The VAP move confirm would trigger the server 104 to release the DD-VAP on PAP 102A by sending a VAP release message. If the PAP 102A receives the VAP release message, the PAP 102A cancels the DD-VAP of the station 106. Afterwards, the station 106 is served by the DD-VAP on PAP 102B. Otherwise, the DD-VAP on PAP 102A continues to serve the station. In one embodiment, the operating channel and the BSSID is the same before and after the VAP movement so that the station 106 could not require executing channel scanning, re-authentication and re-association. The station 106 could not be aware of the handover between different PAPs.

Figure 16:
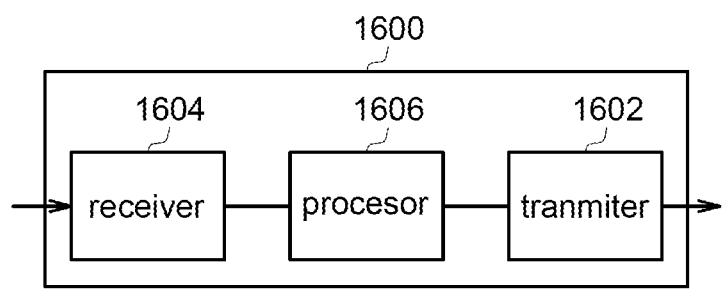
FIG. 16 is a block diagram showing a wireless communication 1600 device according to one embodiment of the present disclosure.

FIG. 16 is a block diagram showing a wireless communication 1600 device according to one embodiment of the present disclosure. The wireless communication device 1600 comprises a transmitter 1602 for sending data, a receiver 1604 for receiving data, and a processor 1606 coupled with the transmitter 1602 and receiver 1604, for processing the received data. The wireless communication device 1600 can be a PAP 102 or can perform functions of the PAP 102 as mentioned in previous embodiments. In other words, the transmitter 1602 can send data to the station 106 and/or the server 104, the receiver 1604 can receive data from the station 106 and/or the server 104, and the processor 1606 can process the received data to perform procedures of creation, management and/or movement of VAP, as described above. Taking the wireless communication method described in FIG. 2 for example, the receiver 1604 receives a probe request from a station 106. The transmitter 1602 sends a VAP setup request to the server 104 in response to the probe request. The processor 1606 creates a DD-VAP having a SSID for the station 106 according to a VAP setup response sent from the server 104, making the transmitter 1602 send a probe reply including the SSID of the DD-VAP to the station.

The present disclosure further discloses examples of a non-transitory computer readable recording medium. The non-transitory computer readable recording medium stores one or more programs. The one or more programs causes a processor to perform the method according to the above-mentioned method after the one or more programs are loaded on a computer and are executed.

The wireless communication method, the wireless communication device and the non-transitory computer readable recording medium of the present disclosure can be applied in a number of communication scenarios, examples of which are provided as follows.

Figure 17A:
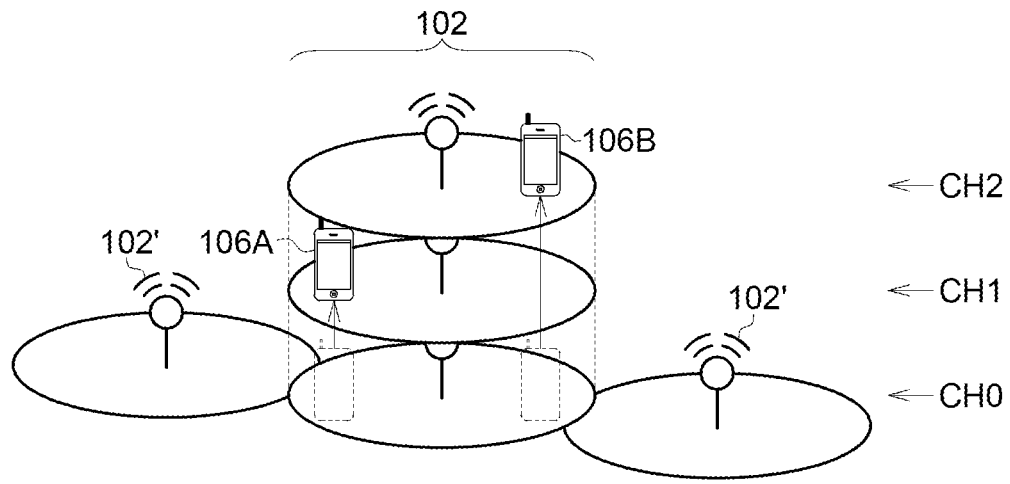
FIG. 17A is a schematic diagram showing a PAP 102 serving stations 106A and 106B by using DD-VAPs according to one embodiment of the present disclosure.

FIG. 17A is a schematic diagram showing a PAP 102 serving stations 106A and 106B by using DD-VAPs according to one embodiment of the present disclosure. Initially, assume that the stations 160A and 160B are connected to the PS-VAP of the PAP 102 through the control channel CH0. Then, in response to the configuration of the server 104 (not shown), the PAP 102 creates a DD-VAP on channel CH1 for the station 106A and a DD-VAP on channel CH2 for the station 106B. Since the channels CH1 and CH2 are different from the control channel CH0, co-channel interference caused by neighbor PAPs 102' could be reduced.

Figure 17B:
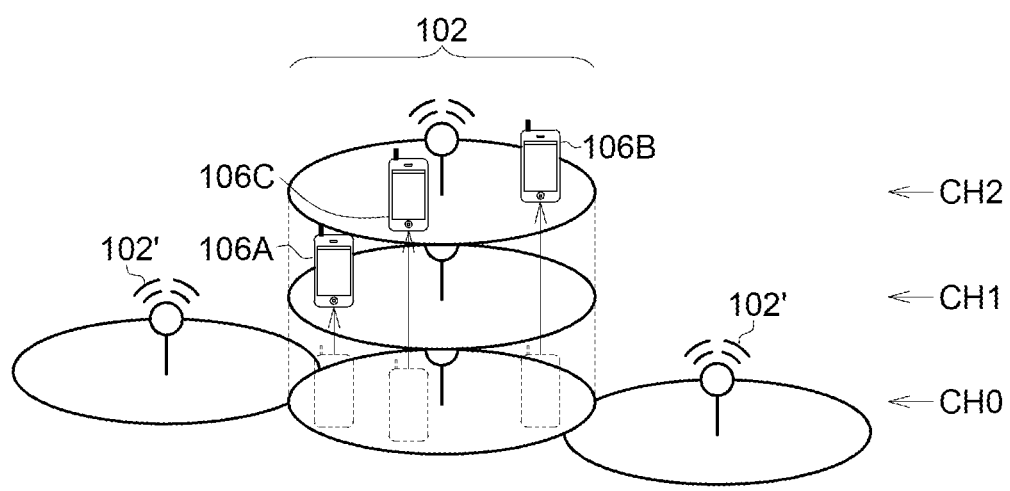
FIG. 17B is a schematic diagram showing a PAP 102 serving stations 106A, 106B and 106C by using DD-VAPs according to one embodiment of the present disclosure.

In the example of FIG. 17A, a DD-VAP serves one station 106A/106B, but the present disclosure is not limited thereto. As shown in FIG. 17B, the PAP 102 can create a DD-VAP on channel CH2 for both of the stations 106B and 106C.

Figure 18:
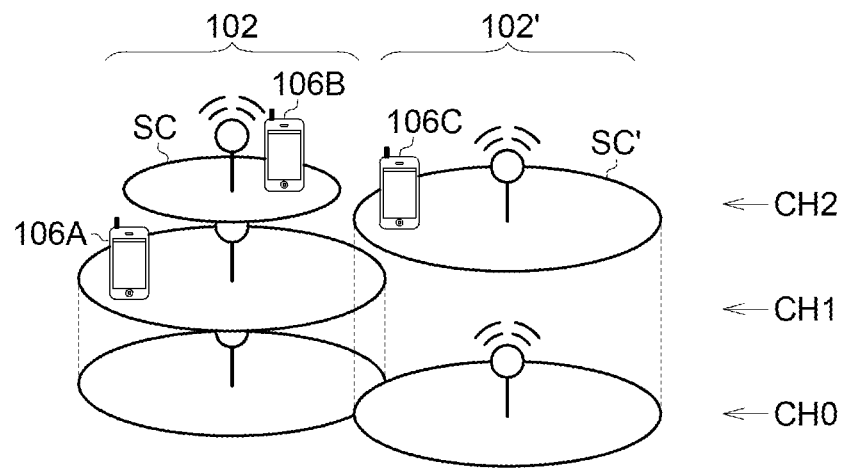
FIG. 18 is a schematic diagram showing a PAP 102 serving stations 106A and 106B by using DD-VAPs according to another embodiment of the present disclosure.

FIG. 18 is a schematic diagram showing a PAP 102 serving stations 106A and 106B by using DD-VAPs according to another embodiment of the present disclosure. In this embodiment, the PAP 102 not only creates DD-VAPs on channels CH1 and CH2 for the stations 106A and 106B, but it also adjusts the transmission power of the DD-VAPs to reduce the chance of occurrence of co-channel interference. As shown in FIG. 17, the stations 106B and 106C share the same channel CH2 and may occur co-channel interference on channel CH2. To avoid such interference, the PAP 102 could reduce the transmission power of the DD-VAP of the station 106B to avoid an overlap between the serving coverage SC of the PAP 102 and the serving coverage SC' of the neighbor PAP 102'. The station 106A under the same PAP is not affected by the reduced serving coverage SC since the station 106A is served by its DD-VAP instead of DD-VAP of the station 106B.

Figure 19:
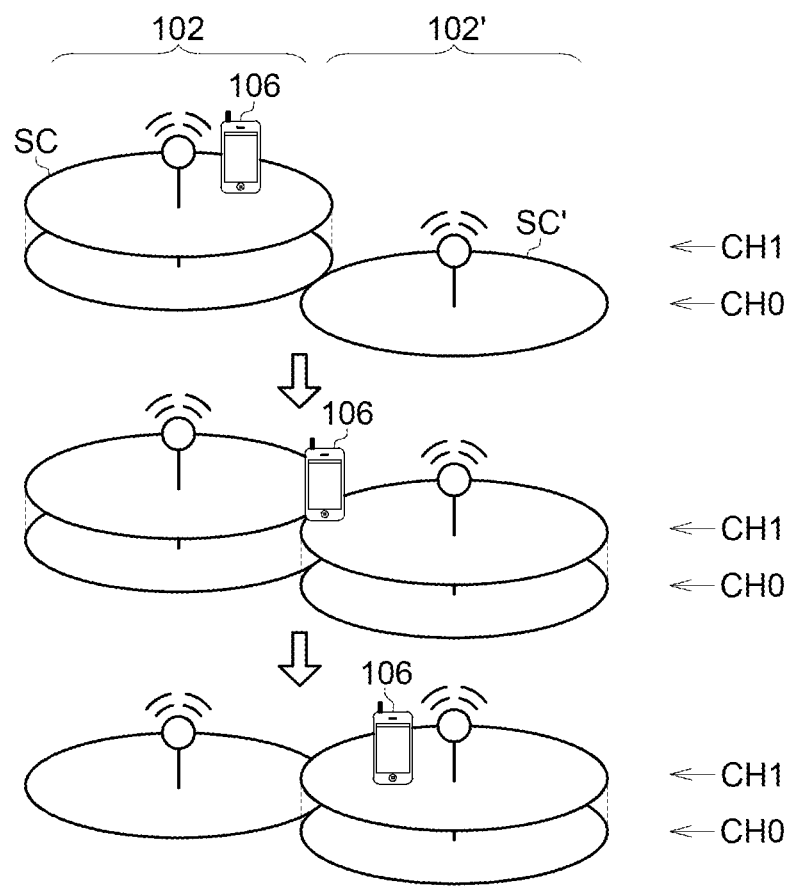
FIG. 19 is a schematic diagram showing handover operations of DD-VAPs.

FIG. 19 is a schematic diagram showing handover operations of DD-VAPs. Initially, assume that the PAP 102 creates a DD-VAP on channel CH1 for serving the station 106 and the neighbor PAP 102' operates on a control channel CH0. When the station 106 is leaving the serving coverage SC of the PAP 102, the neighbor PAP 102' can create a DD-VAP on channel CH1 for the station 106 so that the station 106 can connect to both DD-VAPs of the PAPs 102 and 102' on channel CH1. After that, if the station 106 still stably moves into the serving coverage SC' of the PAP 102', the DD-VAP on PAP 102 is released and then the seamless handover operation is completed. In this embodiment, because the station 106 always connects to the DD-VAP(s), data loss during handover can be avoided. Moreover, because the neighbor PAP 102' can prepare a duplicated VDD-VAP for the station 106 when it is found that the station 106 is leaving the PAP 102, latency due to handover channel scanning, authentication and association is saved.

Figure 20:
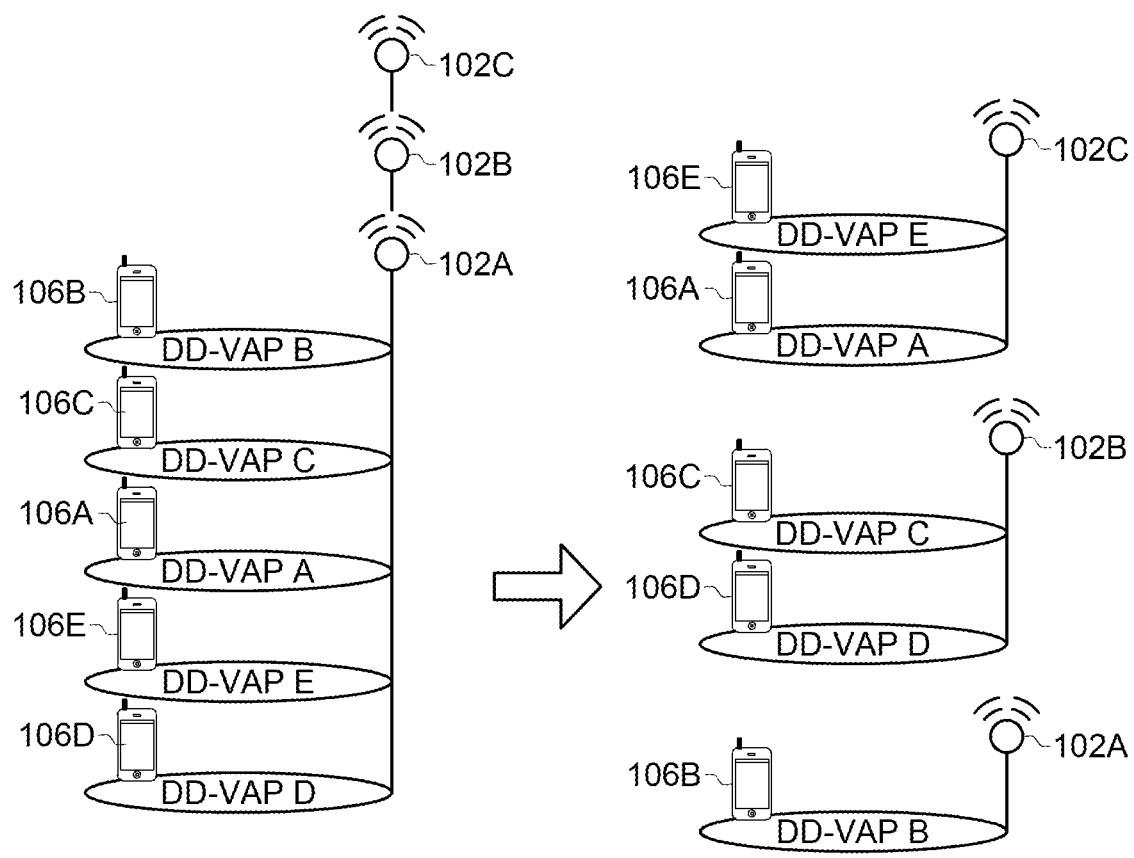
FIG. 20 is a schematic diagram showing load balance operations of PAPs.

FIG. 20 is a schematic diagram showing load balance operations of PAPs. In FIG. 20, assume that the PAP 102A serves the stations 106A, 106B, 106C, 106D and 160E initially because the PAP 102A has the strongest signal strength for the stations 106A to 160E. The server 104 (not shown) may determine whether to move DD-VAP A~E to offload the stations 106A to 160E to other PAPs 106B and/or 106C based on the current network condition. For example, as shown in FIG. 20, if the sever 104 determines that the PAP 102A is over-loaded, the server 104 may enable the PAP 102A to offload some stations, such as stations 106C and 106D, to the PAP 102B by moving DD-VAP C and DD-VAP D, and offload other stations, such as stations 106E and 106A to the PAP 102C by moving DD-VAP E and DD_VAP A, wherein the stations 106C and 106D are respectively associated with the DD-VAP C and DD-VAP D, and the stations 106E and 106A are respectively associated with the DD-VAP E and DD-VAP A. Through traffic offloading, data congestion can be avoided and the network throughput can be improved.

In summary, according to a wireless communication method, a wireless communication device and a non-transitory computer readable recording medium of the present disclosure, a station in the network can be provided with a DD-VAP. The DD-VAP can be customized and configured by the server. By using the DD-VAP, the station can use its station profile to access the network and could reduce the latency of network entry. In addition, a PAP in the network can create a PS-VAP supporting open access on a control channel. When a station wants to access the network, it just needs to listen on the control channel for searching available PAPs and thus latency due to channel scanning could be reduced.

It will be clear to those skilled in the art that various modifications and variations could be made to the disclosed exemplary embodiments. It is intended that the specification and examples be considered as exemplary only, with a true scope of the disclosure being indicated by the following claims and their equivalents.

What is claimed is:

1. A wireless communication method, comprising:
creating a Public and Static Virtual Access Point (PS-VAP) on a Physical Access Point (PAP) when the PAP powers on, the PS-VAP is public to any station;
after a first station hears a beacon of the PS-VAP created on the PAP, sending a probe request from the first station to the PS-VAP created on the PAP, wherein the probe request comprises an ID of the first station and a Service Set Identifier (SSID), and the first station is a user equipment (UE);
sending a Virtual Access Point (VAP) setup request from the PS-VAP to a server in response to the probe request from the PS-VAP, the VAP setup request including the SSID, the ID of the first station and an ID of the PAP;
creating on the PAP a first Dedicated-and-Dynamic VAP (DD-VAP) dedicated for the first station and a second DD-VAP dedicated for a second station, the first DD-VAP having the SSID on the PAP according to a VAP setup response sent from the server if the first station is admitted by the server; and
sending a probe reply including the SSID of the first DD-VAP to the first station from the first DD-VAP,
wherein an initial VAP setup request is sent to the server when the PAP powers on, and the PS-VAP is created on the PAP in response to an initial VAP setup response sent from the server, and
wherein the PS-VAP allows open access and is public to any stations.

2. The wireless communication method according to claim 1, wherein the server checks the VAP setup request to determine whether the first station is registered and whether current resources of the PAP is enough to support the first station; if the first station is registered and the current resources of the PAP is enough to support the first DD-VAP of the first station, the server sends the VAP setup response to the PAP, otherwise, the server rejects the VAP setup request.

3. The wireless communication method according to claim 1, wherein the VAP setup response comprises a station profile of the first station, wherein the station profile of the first station describes parameters for creating the first DD-VAP.

4. The wireless communication method according to claim 3, wherein said creating the first DD-VAP further comprises:
using the station profile to creating the first DD-VAP.

5. The wireless communication method according to claim 1, further comprising:
creating the first DD-VAP on a first channel according to the VAP setup response; and
in response to a channel assignment decision made by the server, sending a channel switch message to notify the first station of a channel switch that the first DD-VAP is switched from the first channel to a second channel.

6. The wireless communication method according to claim 5, wherein the channel switch message is a Channel Switch Announcement (CSA) message.

7. The wireless communication method according to claim 1, further comprising:

performing data transmission with the first station;
sending a Clear to Send (CTS)-to-Self message to the first station to defer the data transmission with the first station; and
switching to the second DD-VAP and performing data transmission with the second station after the CTS-to-Self message is sent to the first station.

8. The wireless communication method according to claim 7, wherein the CTS-to-Self message indicates a duration that the first DD-VAP is not available for the first station.

9. The wireless communication method according to claim 1, further comprising:
determining whether the first station is leaving a serving coverage of the first DD-VAP;
sending a VAP move request to the server when the first station is leaving the serving coverage of the first DD-VAP;
selecting at least one target PAP in response to the VAP move request; and
releasing the first DD-VAP, which is determined not to serve the first station, after ensuring that the first station is serving by the at least one target PAP.

10. The wireless communication method according to claim 9, wherein the server sends a VAP duplication message comprising context of the first DD-VAP on the PAP to the at least one target PAP in response to the VAP move request.

11. The wireless communication method according to claim 10, wherein the at least one target PAP creates a clone of the first DD-VAP for serving the first station according to the VAP duplication message.

12. The wireless communication method according to claim 1, further comprising:
receiving a status request from the server;
sending a status report comprising a measured channel status between the first DD-VAP and the first station to the server in response to the status request; and
changing operating channel and/or adjusting transmission power of the first DD-VAP according to a reconfiguration decision which the server makes according to the status report made by the server.

13. The wireless communication method according to claim 12, further comprising:
sending a measurement request to ask station measurement results of channel status between the first DD-VAP and the first station; and
generating the status report according to the measurement results obtained from the first station.

14. The wireless communication method according to claim 1, wherein the PS-VAP on the PAP is cancelled when the PAP powers off.

15. The wireless communication method according to claim 1, further comprising:
relaying an association request from the first station to the server, wherein the server determines whether the first station is allowed to be registered in response to the association request; and
relaying an association response from the server to the first station to inform the first station is allowed to be registered with the server or not.

16. The wireless communication method according to claim 1, wherein the number of stations serving by the first DD-VAP is one.

17. A non-transitory computer readable recording medium for storing one or more programs, the one or more programs causing a processor to perform the method according to claim 1 after the one or more programs are loaded on a computer and are executed.

18. A wireless communication device, comprising:
a receiver, receiving a probe request from a first station after the first station hears a beacon of a Public and Static Virtual Access Point (PS-VAP) created on the wireless communication device, the PS-VAP being created on the wireless communication device when the wireless communication device powers on, the PS-VAP being public to any station, the probe request comprising an ID of the first station and a Service Set Identifier (SSID);
a transmitter, sending a Virtual Access Point (VAP) setup request from the PS-VAP to a server in response to the probe request, the VAP setup request including the SSID, the ID of the first station and an ID of the PAP; and
a processor coupled with the receiver and the transmitter, creating on the wireless communication device a first Dedicated-and-Dynamic VAP (DD-VAP) dedicated for the first station and a second DD-VAP dedicated for a second station, the first DD-VAP having the SSID according to a VAP setup response sent from the server if the first station is admitted by the server, making the transmitter send a probe reply including the SSID of the first DD-VAP to the first station,
wherein the transmitter is configured to send an initial VAP setup request to the server when the wireless communication device powers on, and the processor is configured to create the PS-VAP in response to an initial VAP setup response sent from the server, and
wherein the PS-VAP allows open access and is public to any stations.

19. The wireless communication device according to claim 18, wherein the server checks the VAP setup request to determine whether the first station is registered and whether current resources of the wireless communication device is enough to support the first station; if the first station is registered and the current resources of the wireless communication device is enough to support the first DD-VAP of the first station, the server sends the VAP setup response to the wireless communication device.

20. The wireless communication device according to claim 18, wherein the VAP setup response comprises a station profile of the first station.

21. The wireless communication device according to claim 20, the processor uses the station profile to creating the first DD-VAP, wherein the station profile of the first station describes parameters for creating the first DD-VAP.

22. The wireless communication device according to claim 18, wherein the processor creates the first DD-VAP on a first channel according to the VAP setup response, making the transmitter send a channel switch message to notify the first station of a channel switch that the first DD-VAP is switched from the first channel to a second channel, in response to a channel assignment decision made by the server.

23. The wireless communication device according to claim 22, wherein the channel switch message is a Channel Switch Announcement (CSA) message.

24. The wireless communication device according to claim 18, wherein the processor performs data transmission with the first station, making the transmitter send a Clear to Send (CTS)-to-Self message to the first station to defer the data transmission with the first station, and performing data transmission with the second station after the CTS-to-Self message is sent to the first station.

25. The wireless communication device according to claim 24, wherein the CTS-to-Self message indicates a duration that the first DD-VAP is not available for the first station.

26. The wireless communication device according to claim 18, wherein the processor determines whether the first station is leaving a serving coverage of the wireless communication device, making the transmitter send a VAP move request to the server when the first station is leaving the serving coverage of the wireless communication device, and releasing the first DD-VAP, which is determined not to serve the first station, after ensuring that the first station is serving by at least one target wireless communication device, wherein the at least one target wireless communication device is selected by the server in response to the VAP move request.

27. The wireless communication device according to claim 26, wherein the server sends a VAP duplication message comprising context of the first DD-VAP on the wireless communication device to the at least one target wireless communication device in response to the VAP move request.

28. The wireless communication device according to claim 27, wherein the at least one target wireless communication device creates a clone of the first DD-VAP for serving the first station according to the VAP duplication message.

29. The wireless communication device according to claim 18, wherein the receiver receives a status request from the server, the transmitter sends a status report comprising a measured channel status between the first DD-VAP and the first station to the server in response to the status request, and the processor changes operating channel and/or adjusting transmission power of the first DD-VAP according to a reconfiguration decision which the server makes according to the status report made by the server.

30. The wireless communication device according to claim 29, wherein the transmitter sends a measurement request to ask station measurement results of channel status between the wireless communication device and the first station, and the processor generates the status report according to the measurement results obtained from the first station.

31. The wireless communication device according to claim 18, wherein the PS-VAP on the wireless communication device is cancelled when the wireless communication device powers off.

32. The wireless communication device according to claim 18, wherein the wireless communication device relays an association request from the first station to the server, wherein the server determines whether the first station is allowed to be registered in response to the association request, and relaying an association response from the server to the first station to inform the first station is allowed to be registered with the server or not.

33. The wireless communication device according to claim 18, wherein the number of stations serving by the first DD-VAP is one.

34. The wireless communication method according to claim 1, further comprising:
sending a MAC address and the SSID of the first station from the first station to the server; and
registering the first station by the server by storing a station profile of the first station, wherein the station profile of the first station includes the MAC address and the SSID of the first station.

35. The wireless communication device according to claim 18, wherein:
the first station sends a MAC address and the SSID of the first station to the server; and
the server registers the first station by storing a station profile of the first station, wherein the station profile of the first station includes the MAC address and the SSID of the first station.

* * * * *